(12) United States Patent
Kojo et al.

(10) Patent No.: US 8,511,420 B2
(45) Date of Patent: Aug. 20, 2013

(54) VEHICLE STEERING CONTROL DEVICE

(75) Inventors: Takahiro Kojo, Gotenba (JP);
Theerawat Limpibunterng, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 113 days.

(21) Appl. No.: 12/743,701

(22) PCT Filed: Nov. 19, 2008

(86) PCT No.: PCT/JP2008/071478
§ 371 (c)(1),
(2), (4) Date: Sep. 28, 2010

(87) PCT Pub. No.: WO2009/066789
PCT Pub. Date: May 28, 2009

(65) Prior Publication Data
US 2011/0036660 A1    Feb. 17, 2011

(30) Foreign Application Priority Data
Nov. 19, 2007    (JP) .................................. 2007-299482

(51) Int. Cl.
*B62D 5/04*    (2006.01)
(52) U.S. Cl.
USPC .............................. 180/446; 180/443; 701/41
(58) Field of Classification Search
USPC ..................................... 180/443, 446; 701/41
See application file for complete search history.

(56) References Cited

U.S. PATENT DOCUMENTS

| 6,799,105 | B2* | 9/2004 | Stout et al. ...................... 701/44 |
| 7,203,582 | B2* | 4/2007 | Yokota ............................. 701/41 |
| 7,322,439 | B2* | 1/2008 | Hara et al. ..................... 180/402 |
| 7,406,374 | B2* | 7/2008 | Ono et al. ....................... 701/41 |
| 7,493,984 | B2* | 2/2009 | Ono et al. ..................... 180/404 |
| 7,596,440 | B2* | 9/2009 | Ono ................................ 701/41 |

(Continued)

FOREIGN PATENT DOCUMENTS

| JP | 2000 168604 | 6/2000 |
| JP | 2000-344120 A | 12/2000 |

(Continued)

OTHER PUBLICATIONS

International Search Report issued Feb. 24, 2009 in PCT/JP08/71478 filed Nov. 19, 2008.

(Continued)

*Primary Examiner* — Kevin Hurley
*Assistant Examiner* — Michael Stabley
(74) *Attorney, Agent, or Firm* — Oblon, Spivak, McClelland, Maier & Neustadt, L.L.P.

(57) ABSTRACT

A vehicle steering control device includes an electric power steering unit, a steering ratio varying unit which drives an output member relative to an input member driven by steering operation of a driver to vary a steering ratio, and a control unit which controls the steering ratio varying unit. The control unit decreases in magnitude the relative drive velocity of the output member driven by the steering ratio varying unit relative to the input member when the magnitude of a difference between the maximum value of the steering drive velocity range of said steerable wheels which allows said power steering unit to generate a required steering assisting power and an actual steering drive velocity of said steerable wheels is small in contrast to the large difference.

18 Claims, 25 Drawing Sheets

(56) References Cited

U.S. PATENT DOCUMENTS

2001/0027895 A1* 10/2001 Murata et al. ............... 180/446
2003/0114970 A1* 6/2003 Hara ............................. 701/41
2005/0263339 A1* 12/2005 Ono ............................ 180/443

FOREIGN PATENT DOCUMENTS

| JP | 2001 287657 | 10/2001 |
| JP | 2003 320948 | 11/2003 |
| JP | 2004 98872 | 4/2004 |
| JP | 2006 131141 | 5/2006 |
| JP | 2006 205895 | 8/2006 |
| JP | 2006-282141 A | 10/2006 |
| JP | 2007-313996 A | 12/2007 |
| WO | WO 2005/047079 A1 | 5/2005 |

OTHER PUBLICATIONS

Japanese Office Action Issued Sep. 5, 2012 in Patent Application No. 2009-542618 (with partial English translation).

* cited by examiner

VEHICLE STEERING CONTROL DEVICE

TECHNICAL FIELD

The present invention relates to a vehicle steering control device and, more particularly, to a vehicle steering control device having an electric power steering unit which generates a steering assisting power for driving steerable wheels to steer and a steering ratio varying unit which drives an output member relative to an input member driven by steering operation of a driver to vary a steering ratio that is a ratio of a steering angle variation quantity of the steerable wheels with respect to a steering operation amount of the driver.

BACKGROUND ART

As one of a vehicle steering control devices, a steering control device has been well known, which has an electric power steering unit which generates a steering assisting power for driving steerable wheels to steer and a steering ratio varying unit which drives an output member relative to an input member driven by steering operation of a driver to vary a steering ratio.

As is described in Japanese Patent Laid-Open Publication No. 2001-287657, it has already been known that in a vehicle having a common power source which supplies electric power to both an electric power steering unit and a steering ratio varying unit, a steering ratio is decreased and the steering ratio varying unit is stopped when the power source voltage falls below a predetermined value so as to prevent the electric power steering unit and the steering ratio varying unit from being unable to operate due to the drop of the power source voltage In general, a steering assisting power (assist torque) which an electric power steering unit can generate is finite and decreases as the steering drive velocity of steerable wheels increases. In other words, the maximum value of the steering drive velocity range of steerable wheels under the situation where an electric power steering unit can generate a steering assisting power which it is demanded to generate decreases as a steering assisting power increases.

For that reason, even under the situation where the power source voltage is well above a predetermined value, if the output member is driven to greatly increase the rotation velocity relative to the input member or a rapid steering operation is conducted by a driver with the result that the steering drive velocity of steerable wheels becomes high, there arises a fear of a so-called power assistance failure in which a required steering assisting power can not be generated. That is, there is a fear that a steering assisting power which is required for the power steering unit becomes relatively larger than the steering assisting power which the power steering unit can generate for the reason that the steering drive velocity of steerable wheels increases.

It is to be noted that the problem of a power assistance failure not only arises in the case where the steering drive velocity of steerable wheels increases, but arises in the case where a steering assisting power which is required for the power steering unit increases. The problem of a power assistance failure arises even under the situation where the power source voltage is well above a predetermined value. Therefore, even if a predetermined value of the power source voltage is set high in the steering control device described in the above-mentioned Laid-Open Publication, the problem of a power assistance failure due to the increase of the steering drive velocity of steerable wheels can not be solved.

If a power steering unit which can generate a high steering assisting power is used, the possibility of a power assistance failure even under the situation where the steering drive velocity of steerable wheels or the required steering assisting power becomes high. In that case, however, a power steering unit of large and high power type is essential and a power source of high voltage and high capacity type is needed. Accordingly, the size and cost of the steering control device are inevitably increased and the embarkation capability of the steering control device is decreased.

DISCLOSURE OF THE INVENTION

A primary object of the present invention is to modify the control quantity of a steering ratio varying unit so that the steering drive velocity of steerable wheels does not increase excessively under the situation where there is a fear that a steering assisting power which is required for the power steering unit becomes relatively larger than the steering assisting power which the power steering unit can generate for the reason that the steering drive velocity of steerable wheels increases or the steering assisting power which is required for the power steering unit increases, to thereby reduce the possibility of a power assistance failure under the situation where the steering assisting power which the power steering unit can generate becomes lower than the steering assisting power which is required for the power steering unit.

The present invention provides a vehicle steering control device having an electric power steering unit which generates steering assisting power for driving steerable wheels to steer, a steering ratio varying unit which drives an output member relative to an input member driven by steering operation of a driver to vary a steering ratio that is a ratio of a steering angle variation value of the steerable wheels with respect to a steering operation quantity of the driver, and a control means which controls the steering ratio varying unit; the steering ratio varying unit being provided on the side of the input member with respect to the power steering unit as viewed with respect to a transmitting path of the steering operation of the driver, wherein the control means decreases in magnitude the relative drive velocity of the output member driven by the steering ratio varying unit relative to the input member when the electric power required by the power steering unit is high as compared with the case where the electric power required by the power steering unit is low.

According to the above-described configuration, the relative drive velocity of the output member driven by the steering ratio varying unit relative to the input member is decreased in magnitude when the electric power required by the power steering unit is high as compared with that case where the electric power required by the power steering unit is low. Accordingly, it is possible to lower the steering drive velocity of steerable wheels to thereby increase the steering assisting power that the power steering unit can generate, which enables to effectively reduce the possibility of a power assistance failure under the situation where the steering assisting power which the power steering unit can generate becomes lower than the steering assisting power which is required for the power steering unit.

The above-mentioned configuration may be such that: the control means decreases in magnitude the relative drive velocity of the output member driven by the steering ratio varying unit relative to the input member when the magnitude of a difference between the maximum value of the steering drive velocity range of the steerable wheels which allows the power steering unit to generate a required steering assisting power and an actual steering drive velocity of the steerable wheels is small as compared with the case where the magnitude of the steering drive velocity difference is large.

According to this configuration, the relative drive velocity of the output member driven by the steering ratio varying unit relative to the input member is decreased in magnitude when the magnitude of a difference between the maximum value of the steering drive velocity range of the steerable wheels which allows the power steering unit to generate a required steering assisting power and an actual steering drive velocity of the steerable wheels is small as compared with that case where the magnitude of the steering drive velocity difference is large. Accordingly, the steering drive velocity of the steerable wheels can positively be lowered as compared with the case where the relative drive velocity of the output member is not decreased in magnitude, which enables to positively reduce the possibility of a power assistance failure under the situation where the steering assisting power which the power steering unit can generate becomes lower than the steering assisting power which is required for the power steering unit for the reason that the steering drive velocity of the steerable wheels increases as in the case of an urgent steering for avoiding danger.

The above-mentioned configuration may be such that: the control means sets a limiting value for the relative drive velocity of the output member so that the limiting value decreases when the steering drive velocity difference is small in magnitude as compared with the case where the steering drive velocity difference is large in magnitude, and limits the relative drive velocity in magnitude to the limiting value when the relative drive velocity caused by the steering ratio varying unit is larger than the limiting value in magnitude but does not limit the relative drive velocity in magnitude when the relative drive velocity caused by the steering ratio varying unit is not larger than the limiting value in magnitude.

According to this configuration, a limiting value for the relative drive velocity of the output member is set so that the limiting value decreases when the steering drive velocity difference is small in magnitude as compared with the case where the steering drive velocity difference is large in magnitude, and the relative drive velocity is limited in magnitude to the limiting value when the relative drive velocity caused by the steering ratio varying unit is larger than the limiting value in magnitude. Accordingly, the relative drive velocity caused by the steering ratio varying unit can positively be prevented from exceeding the limiting value in magnitude, which enables to positively prevent a power assistance failure from occurring under the situation where the steering assisting power which the power steering unit can generate becomes lower than the steering assisting power which is required for the power steering unit for the reason that the steering drive velocity of the steerable wheels increases.

The above-mentioned configuration may be such that: the control means decreases the magnitude of the relative drive velocity caused by the steering ratio varying unit when the difference between the maximum value of the steering assisting power range which the power steering unit can generate when the steerable wheels are driven to steer at a required steering drive velocity and an actual steering assisting power of the power steering unit is small in magnitude as compared with the case where the steering assisting power difference is large in magnitude.

According to this configuration, the magnitude of the relative drive velocity caused by the steering ratio varying unit is decreased when the difference between the maximum value of the steering assisting power range which the power steering unit can generate when the steerable wheels are driven to steer at a required steering drive velocity and an actual steering assisting power of the power steering unit is small in magnitude as compared with the case where the steering assisting power difference is large in magnitude. Accordingly, the steering drive velocity of the steerable wheels can positively be reduced as compared with the case where the magnitude of the relative drive velocity is not decreased, which enables to effectively reduce the possibility of a power assistance failure under the situation where the steering assisting power which the power steering unit can generate becomes lower than the steering assisting power which is required for the power steering unit for the reason that the steering assisting power which is required for the power steering unit increases as in the case of a stationary steering.

The above-mentioned configuration may be such that: the control means sets a limiting value for the relative drive velocity of the output member so that the limiting value decreases when the steering assisting power difference is small in magnitude as compared with the case where the steering assisting power difference is large in magnitude, and limits the magnitude of the relative drive velocity caused by the steering ratio varying unit to the limiting value when the relative drive velocity is larger than the limiting value in magnitude but does not limit the relative drive velocity in magnitude when the relative drive velocity is not larger than the limiting value in magnitude.

According to this configuration, a limiting value for the relative drive velocity of the output member is set so that the limiting value decreases when the steering assisting power difference is small in magnitude as compared with the case where the steering assisting power difference is large in magnitude, and the magnitude of the relative drive velocity caused by the steering ratio varying unit is limited to the limiting value when the relative drive velocity is larger than the limiting value in magnitude. Accordingly, the magnitude of the relative drive velocity caused by the steering ratio varying unit can positively be prevented from exceeding the limiting value in magnitude, which enables to positively prevent a power assistance failure from occurring under the situation where the steering assisting power which the power steering unit can generate becomes lower than the steering assisting power which is required for the power steering unit for the reason that the steering assist force which is required for the power steering unit increases.

The above-mentioned configuration may be such that: the control means sets a first limiting value for the relative drive velocity of the output member so that the first limiting value decreases when the magnitude of a difference between the maximum value of the steering drive velocity range of the steerable wheels which allows the power steering unit to generate a required steering assisting power and an actual steering drive velocity of the steerable wheels is small as compared with that case where the magnitude of the difference is large; the control means sets a second limiting value of the relative velocity of the output member so that the second limiting value decreases when the difference between the maximum value of the steering assisting power range which the power steering unit can generate when the steerable wheels are driven to steer at a required steering drive velocity and an actual steering assisting power of the power steering unit is small in magnitude as compared with the case where the steering assisting power difference is large in magnitude; the control means sets the smaller one of the first and second limiting values to a final limiting value; and the control means limits the magnitude of the relative drive velocity caused by the steering ratio varying unit to the final limiting value when the relative drive velocity is larger than the final limiting value in magnitude but does not limit the relative drive velocity in magnitude when the relative drive velocity is not larger than the final limiting value in magnitude.

According to this configuration, the final limiting value of the relative drive velocity of the output member is set so that the limiting value decreases when the magnitude of a difference between the maximum value of the steering drive velocity range of the steerable wheels which allows the power steering unit to generate a required steering assisting power and an actual steering drive velocity of the steerable wheels is small as compared with that case where the magnitude of the steering drive velocity difference is large and so that the limiting value decreases when the difference between the maximum value of the steering assisting power which the power steering unit can generate when the steerable wheels are driven to steer at a required steering drive velocity and an actual steering assisting power of the power steering unit is small in magnitude as compared with the case where the steering assisting power difference is large in magnitude. The magnitude of the relative drive velocity caused by the steering ratio varying unit is limited to the limiting value when the relative drive velocity is larger than the final limiting value in magnitude.

Therefore, the magnitude of the relative drive velocity caused by the steering ratio varying unit can positively be prevented from exceeding the final limiting value in magnitude, which enables to positively prevent a power assistance failure from occurring under the situation where the steering assisting power which the power steering unit can generate becomes lower than the steering assisting power which is required for the power steering unit for the reason that the steering drive velocity of the steerable wheels increases as in the case of an urgent steering for avoiding danger or the steering assisting power which is required for the power steering unit increases as in the case of a stationary steering.

According to the above-described configuration, the relative drive velocity caused by the steering ratio varying unit is not limited in magnitude when the relative drive velocity is not larger than the final limiting value in magnitude. Accordingly, it is possible to positively prevent the relative drive velocity from being unnecessarily limited in magnitude and the steering ratio control by the steering ratio varying unit from being unnecessarily limited due to unnecessary limitation of the relative drive velocity under the situation where there is no possibility of a power assistance failure which occurs for the reason that the steering drive velocity of the steerable wheels increases or the steering assisting power which is required for the power steering unit increases.

The above-mentioned configuration may be such that: the power steering unit operates utilizing the electric energy supplied by a power source, and the control means increases the degree of decreasing the relative drive velocity in magnitude when the electric energy which the power source can supply is low as compared with the case where the electric energy which the power source can supply is high.

In general, irrespective of a steering drive velocity of the steerable wheels, the maximum value of the steering assisting power range which an electric power steering unit can generate is small when the electric energy which a power source can supply is low as compared with the case where the electric energy which the power source can supply is high. Accordingly, there is a possibility that the steering assisting power which the power steering unit can generate becomes lower than the steering assisting power which is required for the power steering unit for the reason that the electric energy which the power source can supply decreases. Therefore, in order to reduce the possibility of a power assistance failure which occurs for the reason that the electric energy which the power source can supply decreases, it is preferable to decrease in magnitude the relative drive velocity caused by the steering ratio varying unit so that the steering drive velocity of the steerable wheels decrease in magnitude when the electric energy which the power source can supply is low as compared with the case where the electric energy which the power source can supply is high.

According to above-described configuration, the degree of decreasing the relative drive velocity is increased in magnitude when the electric energy which the power source can supply is low as compared with the case where the electric energy which the power source can supply is high. Accordingly, the magnitude of the relative drive velocity can positively be decreased when the electric energy which the power source can supply is low and the steering assisting power which the power steering unit can generate is small as compared with the case where the electric energy which the power source can supply is high and the steering assisting power which the power steering unit can generate is large. Therefore, the possibility of a power assistance failure can positively be reduced regardless of variation in the electric energy which the power source can supply.

The above-mentioned configuration may be such that: the control means increases the degree of decreasing the relative drive velocity in magnitude when the steered angle of the steerable wheels is large in magnitude as compared with the case where the steered angle of the steerable wheels is small in magnitude.

In general, since the load on an electric power steering unit increases due to self-aligning torque of the steerable wheels as the steered angle of the steerable wheels increases in magnitude, the steering assisting power which is required for the electric power steering unit increases and the electric energy which the electric power steering unit requires increases accordingly. Therefore, as the steered angle of the steerable wheels increases in magnitude, the possibility of a power assistance failure increases.

According to above-described configuration, the degree of decreasing the relative drive velocity in magnitude is increased when the steered angle of the steerable wheels is large in magnitude as compared with the case where the steered angle of the steerable wheels is small in magnitude. Accordingly, the steering drive velocity of the steerable wheels can positively be lowered when the electric energy which the electric power steering unit requires is high. Therefore, the steering assisting power which the power steering unit can generate can be increased, which enables to effectively prevent a power assistance failure from occurring under the situation where the electric energy which the electric power steering unit requires is high.

The above-mentioned configuration may be such that: the control means acquires the information with respect to a friction coefficient of a road surface and decreases the degree of decreasing the relative drive velocity in magnitude when the friction coefficient of a road surface is low as compared with the case where the friction coefficient of a road surface is high.

In general, the load on an electric power steering unit when steerable wheels are driven to steer varies according to the friction coefficient of a road surface. As the friction coefficient of a road surface decreases, the load on an electric power steering unit decreases and the electric energy which the electric power steering unit requires decreases accordingly.

According to above-described configuration, the degree of decreasing the relative drive velocity is decreased in magnitude when the friction coefficient of a road surface is low as compared with the case where the friction coefficient of a road surface is high. Accordingly, it is possible to effectively prevent the magnitude of the relative drive velocity caused by the steering ratio varying unit from being unnecessarily decreased and it is possible to effectively prevent the magnitude of the steering drive velocity of the steerable wheels from being unnecessarily lowered under the situation where the friction coefficient of a road surface is low while effectively preventing a power assistance failure from occurring when the load on the electric power steering unit increases under the situation where the friction coefficient of a road surface is high.

The above-mentioned configuration may be such that: the power steering unit operates utilizing the electric energy supplied by a power source, and the control means decreases the degree of decreasing the relative drive velocity in magnitude and limits the output of each of other units which operate utilizing the electric energy supplied by the power source when the urgent necessity of altering an advancing direction of the vehicle is high as compared with the case where the urgent necessity of altering an advancing direction of the vehicle is low.

According to this configuration, the degree of decreasing the relative drive velocity is decreased in magnitude when the urgent necessity of altering an advancing direction of the vehicle is high as compared with the case where the urgent necessity of altering an advancing direction of the vehicle is low. Accordingly, it is possible to suppress the decrease of the relative drive velocity to efficiently drive the steerable wheels to steer to thereby effectively alter the advancing direction of the vehicle. The output of each of other units which operate utilizing the electric energy supplied by the power source is limited to reduce the electric energy consumption by the other units. Accordingly, it is possible to reduce the possibility of lack in the electric energy supplied from the power source to the power steering unit, to thereby effectively reduce the possibility of a power assistance failure.

The above-mentioned configuration may be such that: the control means acquires the information with respect to a vehicle speed and decreases the relative drive velocity in magnitude when the vehicle speed is low as compared with the case where the vehicle speed is high.

In general, in a low vehicle speed area, the reactive force from a road surface against the steering drive of steerable wheels is high and the magnitude of the steering assisting power of the power steering unit becomes larger than that in a middle or high vehicle speed area. Since steering operation over a large angular range as in the case of a stationary steering is conducted in a low vehicle speed area, the steering ratio controlled by the steering ratio varying unit is controlled in a velocity-increasing mode in a low vehicle speed area. Therefore, there is a possibility of a power assistance failure due to the steering ratio being controlled in a velocity-increasing mode by the steering ratio varying unit and the increase in magnitude of the steering assisting power of the power steering unit and the possibility is higher in a low vehicle speed area than that in a middle or high vehicle speed area.

According to the above-described configuration, the information with respect to a vehicle speed is acquired and the relative drive velocity is decreased in magnitude when the vehicle speed is high as compared with the case where the vehicle speed is low. Accordingly, it is possible to more effectively reduce the possibility of a power assistance failure for the reason that the steering drive velocity of steerable wheels becomes high under the situation where the steering assisting power of the power steering unit is relatively large in magnitude than in the case where the magnitude of the relative velocity is not varied according to a vehicle speed.

The above-mentioned configuration may be such that: the power steering unit operates utilizing the electric energy supplied by a power source, and the control means variably sets the limiting value according to the electric energy which the power source can supply so that the limiting value decreases when the electric energy which the power source can supply is low as compared with the case where the electric energy which the power source can supply is high.

According to this configuration, the limiting value is variably set according to the electric energy which the power source can supply so that the limiting value decreases when the electric energy which the power source can supply is low as compared with the case where the electric energy which the power source can supply is high. Accordingly, the relative drive velocity can positively be decreased in magnitude when the electric energy which the power source can supply is low and the steering assisting power which the power steering unit can generate is accordingly low as compared with the case where the electric energy which the power source can supply is high and the steering assisting power which the power steering unit can generate is accordingly high. Therefore, the possibility of a power assistance failure can positively be reduced regardless of variation in the electric energy which the power source can supply.

The above-mentioned configuration may be such that: the power steering unit operates utilizing the electric energy supplied by a power source, and the control means variably sets at least one of the first, second and final limiting values according to the electric energy which the power source can supply so that at least one of the limiting values decreases when the electric energy which the power source can supply is low as compared with the case where the electric energy which the power source can supply is high.

According to this configuration, at least one of the first, second and final limiting values is variably set according to the electric energy which the power source can supply so that at least one of the limiting values decreases when the electric energy which the power source can supply is low as compared with the case where the electric energy which the power source can supply is high. Accordingly, the relative drive velocity can positively be decreased in magnitude when the electric energy which the power source can supply is low and the steering assisting power which the power steering unit can generate is accordingly low as compared with the case where the electric energy which the power source can supply is high and the steering assisting power which the power steering unit can generate is accordingly high. Therefore, the possibility of a power assistance failure can positively be reduced regardless of variation in the electric energy which the power source can supply.

The above-mentioned configuration may be such that: the control means acquires the information with respect to a vehicle speed and decreases the limiting value when the vehicle speed is low as compared with the case where the vehicle speed is high.

The above-mentioned configuration may be such that: the control means acquires the information with respect to a vehicle speed and decreases at least one of the first, second and final limiting values when the vehicle speed is low as compared with the case where the vehicle speed is high.

According to these configurations, it is possible to effectively prevent a power assistance failure from occurring for the reason that the steerable wheels are driven to steer in a relatively high velocity under a low vehicle speed situation and the steering assisting power which is required for the power steering unit increases in magnitude while positively preventing the relative drive velocity from being unnecessarily limited in magnitude and preventing the steering ratio control by the steering ratio varying unit from being unnecessarily limited due to unnecessary limitation of the relative drive velocity under the situation where there is no possibility of a power assistance failure.

The above-mentioned configuration may be such that: the control means decreases the magnitude of the relative drive velocity when the vehicle speed is not higher than a first vehicle speed reference value and the magnitude of the steering drive velocity is not smaller than a first steering drive velocity reference value as compared with the case where the vehicle speed is higher than the first vehicle speed reference value and/or the magnitude of the steering drive velocity is smaller than the first steering drive velocity reference value.

In general, when the steerable wheels are steered relatively rapidly over a large angular range at a low vehicle speed as in the case of a stationary steering, the possibility of a power assistance failure increases for the reason that the steering assisting power which is required for the power steering unit further increases in magnitude under the situation where the required steering assisting power is large in magnitude. Therefore, it is possible to decide whether or not a possibility of a power assistance failure is high by determining whether or not a vehicle speed is low and a steering velocity is large in magnitude.

According to above-described configuration, the magnitude of the relative drive velocity is reduced when the vehicle speed is not higher than a first vehicle speed reference value and the magnitude of the steering drive velocity is not smaller than a first steering drive velocity reference value as compared with the case where the vehicle speed is higher than the first vehicle speed reference value or the magnitude of the steering drive velocity is smaller than the first steering drive velocity reference value. Therefore, it is possible to effectively prevent a power assistance failure from occurring for the reason that the steering assisting power which is required for the power steering unit further increases in magnitude while positively preventing the relative drive velocity from being unnecessarily limited in magnitude and preventing the steering ratio control by the steering ratio varying unit from being unnecessarily limited due to unnecessary limitation of the relative drive velocity under the situation where there is no possibility of a power assistance failure.

The above-mentioned configuration may be such that: the control means sets a limiting value for the relative drive velocity of the output member so that the limiting value decreases when the vehicle speed is not higher than a first vehicle speed reference value and the magnitude of the steering drive velocity is not smaller than a first steering drive velocity reference value as compared with the case where the vehicle speed is higher than the first vehicle speed reference value and/or the magnitude of the steering drive velocity is smaller than the first steering drive velocity reference value, and the control means limits the magnitude of the relative drive velocity caused by the steering ratio varying unit to the limiting value when the relative drive velocity is larger than the limiting value in magnitude but does not limit the relative drive velocity in magnitude when the relative drive velocity is not larger than the limiting value in magnitude.

According to this configuration, it is possible to effectively prevent the situation of a power assistance failure from occurring for the reason that the steering assisting power which is required for the power steering unit further increases in magnitude while positively preventing the relative drive velocity from being unnecessarily limited in magnitude and preventing the steering ratio control by the steering ratio varying unit from being unnecessarily limited due to unnecessary limitation of the relative drive velocity under the situation where there is no possibility of a power assistance failure.

The above-mentioned configuration may be such that: the control means decreases the magnitude of the relative drive velocity when the vehicle speed is not smaller than a second vehicle speed reference value which is larger than the first vehicle speed reference value and the magnitude of the steering drive velocity is not smaller than a second steering drive velocity reference value which is larger than the first steering drive velocity reference value as compared with the case where the vehicle speed is lower than the second vehicle speed reference value and/or the magnitude of the steering drive velocity is smaller than the second steering drive velocity reference value.

In general, when the steerable wheels are steered very rapidly over a large angular range at a high vehicle speed as in the case of an urgent steering for avoiding a collision against an obstacle, especially as in the case of steering angle decreasing steering after steering angle increasing steering for avoiding danger, the possibility of a power assistance failure increases for the reason that the steering assisting power of the power steering unit is small in magnitude but the steering drive velocity of the steerable wheels becomes very high. Therefore, it is possible to decide whether or not a possibility of a power assistance failure is high by determining whether or not a vehicle speed is high and a steering velocity is large in magnitude.

According to above-described configuration, the magnitude of the relative drive velocity is decreased when the vehicle speed is not smaller than a second vehicle speed reference value which is larger than the first vehicle speed reference value and the magnitude of the steering drive velocity is not smaller than a second steering drive velocity reference value which is larger than the first steering drive velocity reference value as compared with the case where the vehicle speed is lower than the second vehicle speed reference value or the magnitude of the steering drive velocity is smaller than the second steering drive velocity reference value. Therefore, it is possible to effectively prevent a power assistance failure from occurring for the reason that the steering assisting power of the power steering unit is small in magnitude but the steering drive velocity of the steerable wheels becomes very high while positively preventing the relative drive velocity from being unnecessarily limited in magnitude and preventing the steering ratio control by the steering ratio varying unit from being unnecessarily limited due to unnecessary limitation of the relative drive velocity under the situation where there is no possibility of a power assistance failure.

The above-mentioned configuration may be such that: the control means sets a limiting value for the relative drive velocity so that the limiting value decreases when the vehicle speed is not smaller than a second vehicle speed reference value which is larger than the first vehicle speed reference value and the magnitude of the steering drive velocity is not smaller than a second steering velocity reference value which is larger than the first steering drive velocity reference value as compared with the case where the vehicle speed is lower than the second vehicle speed reference value or the magnitude of the steering drive velocity is smaller than the second steering drive velocity reference value, and the control means limits the magnitude of the relative drive velocity caused by the steering ratio varying unit to the limiting value when the relative drive velocity is larger than the limiting value in magnitude but does not limit the relative drive velocity in magnitude when the relative drive velocity is not larger than the limiting value in magnitude.

According to this configuration, it is possible to effectively prevent a power assistance failure from occurring for the reason that the steering assisting power of the power steering unit is small in magnitude but the steering drive velocity of the steerable wheels becomes very high while positively preventing the relative drive velocity from being unnecessarily limited in magnitude and preventing the steering ratio control by the steering ratio varying unit from being unnecessarily limited due to unnecessary limitation of the relative drive velocity under the situation where there is no possibility of a power assistance failure.

The above-mentioned configuration may be such that: the power steering unit has an output characteristics where the maximum value of the steering assisting power range which the power steering unit can generate increases as the magnitude of the steering drive velocity of the steerable wheels increases.

The above-mentioned configuration may be such that: the steering ratio varying unit varies the steering ratio by rotating an output shaft relative to an input shaft which is actuated by the steering operation of a driver.

The above-mentioned configuration may be such that: the control means calculates a target steering gear ratio on the basis of a vehicle speed; calculates a target rotation angle of the output shaft on the basis of the target steering gear ratio; and rotationally actuate the output shaft relative to the input shaft so that the rotation angle of the output shaft conforms to the target rotation angle.

The above-mentioned configuration may be such that: the control means decreases the magnitude of the rotation velocity of the output shaft relative to the input shaft when the magnitude of the steering drive velocity difference is small as compared with the case where the magnitude of the steering drive velocity difference is large.

The above-mentioned configuration may be such that: the power steering unit operates utilizing the electric energy supplied by a power source, and the control means modifies the magnitude of the steering drive velocity difference according to the electric energy which the power source can supply so that the magnitude of the steering drive velocity difference decreases when the electric energy which the power source can supply is low as compared with the case where the electric energy which the power source can supply is high.

The above-mentioned configuration may be such that: the control means estimates an actual steering drive velocity of the steerable wheels on the basis of the operation velocity of the input member under the assumed situation where the steering ratio is not varied by the steering ratio varying unit.

The above-mentioned configuration may be such that: the control means has means for storing the relationship between a steering assisting power and the maximum value in a range of steering drive velocity of the steerable wheels where the steering assisting power can be generated and calculates the maximum value in a range of steering drive velocity of the steerable wheels from the relationship on the basis of the steering assisting power which the power steering unit generates.

The above-mentioned configuration may be such that: the power steering unit operates utilizing the electric energy supplied by a power source, and the control means modifies the relationship according to the electric energy which the power source can supply so that the maximum value in a range of steering drive velocity of the steerable wheels decreases when the electric energy which the power source can supply is low as compared with the case where the electric energy which the power source can supply is high.

The above-mentioned configuration may be such that: the control means decreases the magnitude of the rotation velocity of the output shaft relative to the input shaft when the magnitude of the steering assisting power difference is small as compared with the case where the magnitude of the steering assisting power difference is large.

The above-mentioned configuration may be such that: the power steering unit operates utilizing the electric energy supplied by a power source, and the control means modifies the magnitude of the steering assisting power difference according to the electric energy which the power source can supply so that the magnitude of the steering assisting power difference decreases when the electric energy which the power source can supply is low as compared with the case where the electric energy which the power source can supply is high.

The above-mentioned configuration may be such that: the control means has means for storing the relationship between a steering drive velocity of the steerable wheels and the maximum value of the steering assisting power range which the power steering unit can generate at the steering drive velocity and calculates the maximum value of the steering assisting power range from the relationship on the basis of the steering drive velocity of the steerable wheels.

The above-mentioned configuration may be such that: the power steering unit operates utilizing the electric energy supplied by a power source, and the control means modifies the relationship according to the electric energy which the power source can supply so that the maximum value in a range of steering drive velocity of the steerable wheels decreases when the electric energy which the power source can supply is low as compared with the case where the electric energy which the power source can supply is high.

The above-mentioned configuration may be such that: the power source is common to both the power steering unit and the steering ratio varying unit and both the power steering unit and the steering ratio varying unit operate utilizing the electric energy supplied from the power source.

BEST MODE FOR CARRYING OUT THE INVENTION

Several preferred embodiments of the present invention will now be described in detail with reference to the accompanying drawings.

First Embodiment

Figure 1:
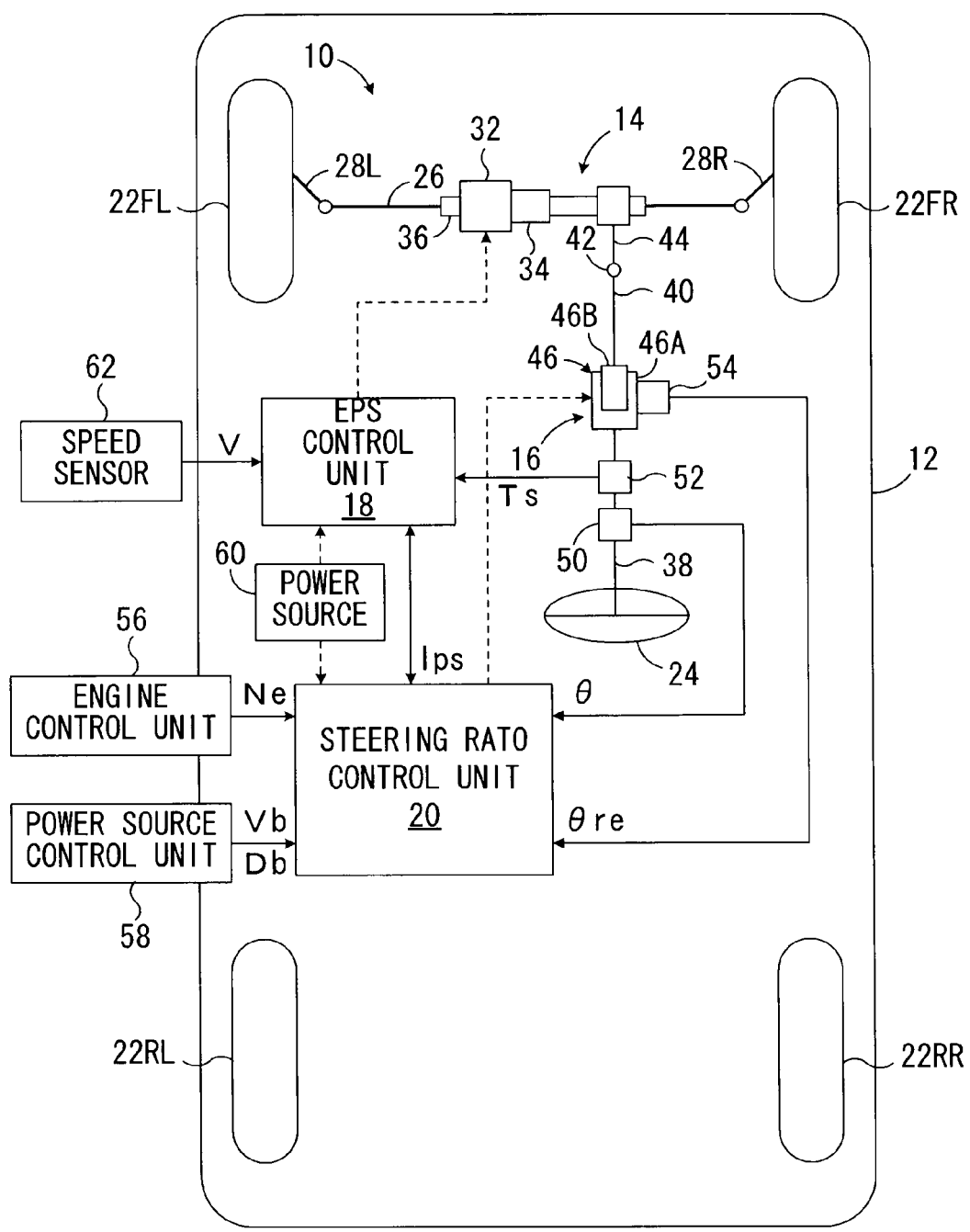
FIG. 1 is a schematic configurational view showing a first embodiment of a vehicle steering control device according to the present invention.

FIG. 1 is a schematic configurational view showing a first embodiment of a vehicle steering control device according to the present invention.

In FIG. 1, references numeral 10 wholly denotes a steering control device for a vehicle 12. The steering control device 10 includes a rack and pinion type electric power steering unit 14 and a steering ratio varying unit (VGRS: variable steering gear ratio system) 16. The power steering unit 14 and the steering ratio varying unit 16 are controlled by an electric power steering (EPS) control unit 18 and a steering ratio control unit 20, respectively.

Although not shown in detail in FIG. 1, the electric power steering control unit 18 and the steering ratio control unit 20 may each comprise a microcomputer and a drive circuit and each microcomputer may have a CPU, ROM, RAM, and an input/output port connected with one another via a bidirectional common bus. The electric power steering control unit 18 and the steering ratio control unit 20 send and receive information to and from each other as necessary.

In FIG. 1, references numerals 22FL and 22FR respectively denote left and right front wheels of the vehicle 12 and 22RL and 22RR respectively denote left and right rear wheels of the vehicle. The power steering unit 14 is actuated in response to an operation of a steering wheel 24 by a driver. The left and right front wheels 22FL and 22FR, which are the steerable wheels, are steered by the electric power steering unit 14 via a rack bar 26, and tie rods 28L and 28R.

Figure 2:
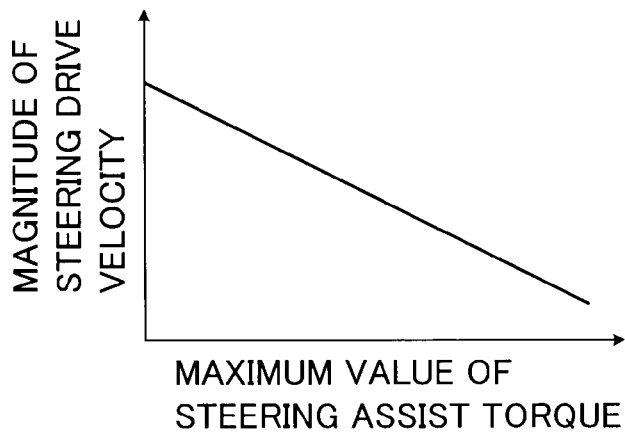
FIG. 2 is a graph showing the relationship between the maximum value of a steering assist torque which an electric power steering unit can generate and the magnitude of a steering drive velocity of steerable wheels.

In the illustrated embodiment, the electric power steering unit 14 is of the type concentric with the rack bar. The electric power steering unit 14 includes an electric motor 32 and a ball-screw type converting mechanism 34 that converts the rotational torque of the electric motor 32 into a force in a reciprocating direction of the rack bar 26. The electric power steering unit 14 generates an steering assisting power to drive the rack bar 26 relative to a housing 36, to thereby generate a steering assist torque which reduces the steering load on the driver. As shown in FIG. 2, the power steering unit 14 has an output characteristic in which a maximum value of the steering assist torque which the unit can generate decreases as the steering drive velocity of the left and right wheels which are the steerable wheels increases in magnitude.

It is to be noted that the relationship between a maximum value of the steering assist torque which the unit can generate and a steering drive velocity of the steerable wheels differs for every power steering unit and differs as well for the configuration of a power source which supplies electric power to the power steering unit. A power steering unit in the steering control unit of the present invention may be a unit of any configuration known in the art as long as it has the above-mentioned output characteristic.

The steering wheel 24 is drivingly connected to a pinion shaft 44 of the electric power steering unit 14 via an upper steering shaft 38, the steering ratio varying unit 16, a lower steering shaft 40, and a universal joint 42. In the illustrated embodiment, the steering ratio varying unit 16 includes an electric motor 46 executing a steering drive for varying the steering ratio. The electric motor 46 has a housing 46A linked to a lower end of the upper steering shaft 38 and a rotor 46B linked to an upper end of the lower steering shaft 40.

As is apparent from the above, the steering ratio varying unit 16 serves as a steering gear ratio varying unit which rotates the lower steering shaft 40 relative to the upper steering shaft 38 so as to vary the ratio of a steered angle of the left and right front wheels 22FL and 22FR which are the steerable wheels to a rotation angle of the steering wheel 24, i.e. the steering ratio (a reciprocal number of steering gear ratio). The steering ratio varying unit 16 also serves as an automatic steered angle varying unit which drivingly turns the left and right front wheels 22FL and 22FR to supplementarily steer relative to the steering wheel 24 independently of steering operation of a driver.

It is to be noted that under the situation where the electric motor 46 does not rotate, the lower steering shaft 40 does not rotate relative to the upper steering shaft 38 and accordingly, the upper steering shaft 38 and the lower steering shaft 40 rotates as if they are a single steering shaft. Although not shown in FIG. 1, the steering ratio varying unit 16 has a lock mechanism. The lock mechanism is maintained non-activated state when the steering ratio varying unit 16 is able to operate normally but the mechanism is activated when the steering ratio varying unit 16 is unable to operate normally, to thereby prevent the lower steering shaft 40 from rotating relative to the upper steering shaft 38.

In the illustrated embodiment, the upper steering shaft 38 is provided with a steering angle sensor 50 which detects a rotation angle of the upper steering shaft 38 as a steering angle θ and a steering torque sensor 52 which detects a steering torque Ts. The steering ratio varying unit 16 is provided with a rotation angle sensor 54 which detects a relative rotation angle θre of the lower steering shaft 40 relative to the upper steering shaft 38 by detecting a relative rotation angle between the housing 46A and the rotor 46B. The outputs of the steering angle sensor 50 and the rotation angle sensor 54 are input to the steering ratio control unit 20. It is to be noted that the rotation angle sensor 54 may be replaced by a sensor which detects a rotation angle θa of the lower steering shaft 40 and a relative rotation angle θre may be derived as a steering angle difference θa−θ.

Input to the steering ratio control unit 20 are a signal indicative of a engine speed Ne from an engine control unit 56 and signals indicative of a voltage Vb of a power source 60 and a degradation level Db of a battery in the power source 60 from a power source control unit 58. Further input to the steering ratio control unit 20 is a signal indicative of an electric current (assist current) Ips supplied to the electric motor 32 of the electric power steering unit 14 from the electric power steering control unit 18. The degradation level Db may be a value calculated in any manner known in the art as long as it increases as a charge capacity of a battery in the power source decreases due to deterioration with age or the like.

On the other hand, input to the electric power steering control unit 18 are a signal indicative of a steering torque Ts detected by the torque sensor 52 and a signal indicative of a vehicle speed V detected by a vehicle speed sensor 62. The signal indicative of a vehicle speed V is output from the electric power steering control unit 18 to the steering ratio control unit 20.

The power source 60 is common to both the power steering unit 14 and the steering ratio varying unit 16 and is charged with electricity generated by an alternator driven by the engine not shown in the figures. The electric power steering control unit 18 controls an electric current value of a drive current supplied from the power source 60 to the electric motor 32 of the power steering unit 14 via its own drive circuit, to thereby control a steering assisting power as will be described hereinafter. The steering ratio control unit 20 controls an electric voltage value of a drive current supplied from the power source 60 to the electric motor 46 of the steering ratio varying unit 16, to thereby control a steering ratio as will be described hereinafter.

Figure 3:
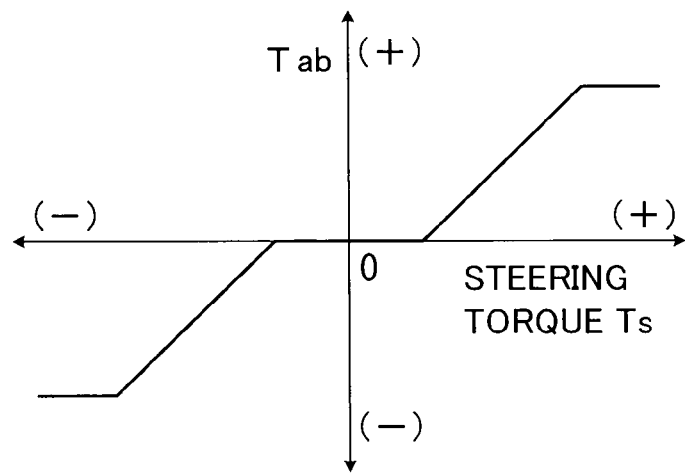
FIG. 3 is a graph showing the relationship between a steering torque Ts and a basic target assist torque Tab.
Figure 4:
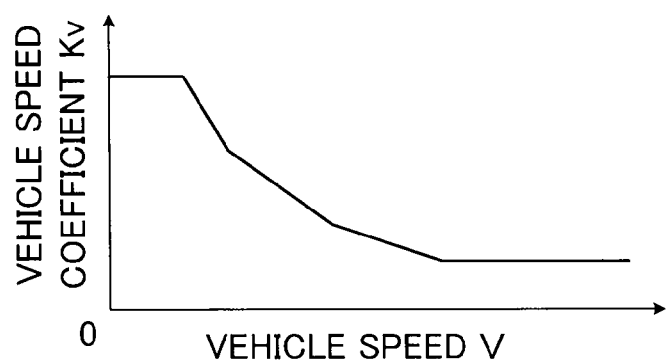
FIG. 4 is a graph showing the relationship between a vehicle speed V and a vehicle speed coefficient Kv.

The electric power steering control unit 18 calculates a basic target assist torque Tab from a map corresponding to the graph shown in FIG. 3 on the basis of a steering torque Ts and calculates a vehicle speed coefficient Kv from a map corresponding to the graph shown in FIG. 4 on the basis of a vehicle speed V. The electric power steering control unit 18 calculates a product of the vehicle speed coefficient Kv and the basic target assist torque Tab to thereby derive a target steering assist torque Tat and controls the electric motor 32 of the power steering unit 14 so that an assist torque Ta conforms to the target steering assist torque Tat. It is to be noted that the control of the power steering unit 14 per se does not constitute a part of the present invention and may be executed in any manner known in the art as long as a steering assisting power increases in magnitude when a vehicle speed V is low as compared with the case where a vehicle speed V is high.

The steering ratio control unit 20 calculates a target steering gear ratio Rgt of the steering ratio varying unit 16 on the basis of a vehicle speed V. It is to be noted that the target steering gear ratio Rgt is calculated so that it is larger than a standard value Rgo in an area where a vehicle speed V is low but it is smaller than the standard value Rgo in an area where a vehicle speed V is high. Accordingly, the velocity ratio of the steering ratio varying unit 16 is a velocity increasing ratio in an area where a vehicle speed V is low whereas it is a velocity decreasing ratio in an area where a vehicle speed V is high.

The steering ratio control unit 20 calculates a target relative rotation angle θpt of the lower steering shaft 40 relative to the upper steering shaft 38 on the basis of a steering angle θ and the target steering gear ratio Rgt. Further, the steering ratio control unit 20 calculates an actual relative rotation angle θpa of the lower steering shaft 40 relative to the upper steering shaft 38 on the basis of a steering angle θ and a relative rotation angle θre and controls the electric motor 46 of the steering ratio varying unit 16 so that the deviation between the target relative rotation angle θpt and the actual relative rotation angle θpa is zero.

In particular, in the first embodiment, the steering ratio control unit 20 calculates a maximum allowable rotation velocity (limit rotation velocity) θpdmax of the lower steering shaft 40 from a map corresponding to the graph shown in FIG. 2 on the basis of an assist torque Ta of the power steering unit 14, and calculates a deviation θpdmax−θpd between the maximum allowable rotation velocity θpdmax of the lower steering shaft 40 and an actual rotation velocity θpd to thereby calculate a rotation velocity margin (rotation velocity allowance) Mpd. The steering ratio control unit 20 calculates an angle variation limiting value per unit time Δθplim of the lower steering shaft 40 so that the limiting value decreases as the rotation velocity margin Mpd decreases, and calculates a target angle variation value per unit time Δθpt which is based on the deviation between a target relative rotation angle θpt of the lower steering shaft 40 and an actual relative rotation angle θpa.

Further, the steering ratio control unit 20 modifies the target relative rotation angle θpt so that the magnitude of the target angle variation value Δθpt is the angle variation limiting value Δθplim when the target angle variation value Δθpt is larger in magnitude than the angle variation limiting value Δθplim but it does not modify the target relative rotation angle θpt when the target angle variation value Δθpt is not larger in magnitude than the angle variation limiting value Δθplim. That is, the steering ratio control unit 20 modifies the target relative rotation angle θpt as necessary so that the target angle variation value Δθpt does not exceed in magnitude the angle variation limiting value Δθplim.

In the first embodiment, the steering ratio control unit 20 calculates a correction coefficient Kb (which is larger than 0 and smaller than 1) on the basis of an engine speed Ne, a voltage Vb of the power source 60, and the degradation level Db of the battery in the power source 60. It is to be noted that the correction coefficient Kb decreases as the possibility that the electricity generation is not executed by an alternator increases, the possibility being assumed on the basis of an engine speed Ne. It is also to be noted that the correction coefficient Kb decreases as the electric energy that can be supplied decreases which is assumed on the basis of a voltage Vb of the power source 60 and the degradation level Db of the battery in the power source 60. Further, the steering ratio control unit 20 multiplies the maximum allowable rotation velocity θpdmax of the lower steering shaft 40 by the correction coefficient Kb to thereby correct the maximum allowable rotation velocity θpdmax with the correction coefficient Kb.

Figure 5:
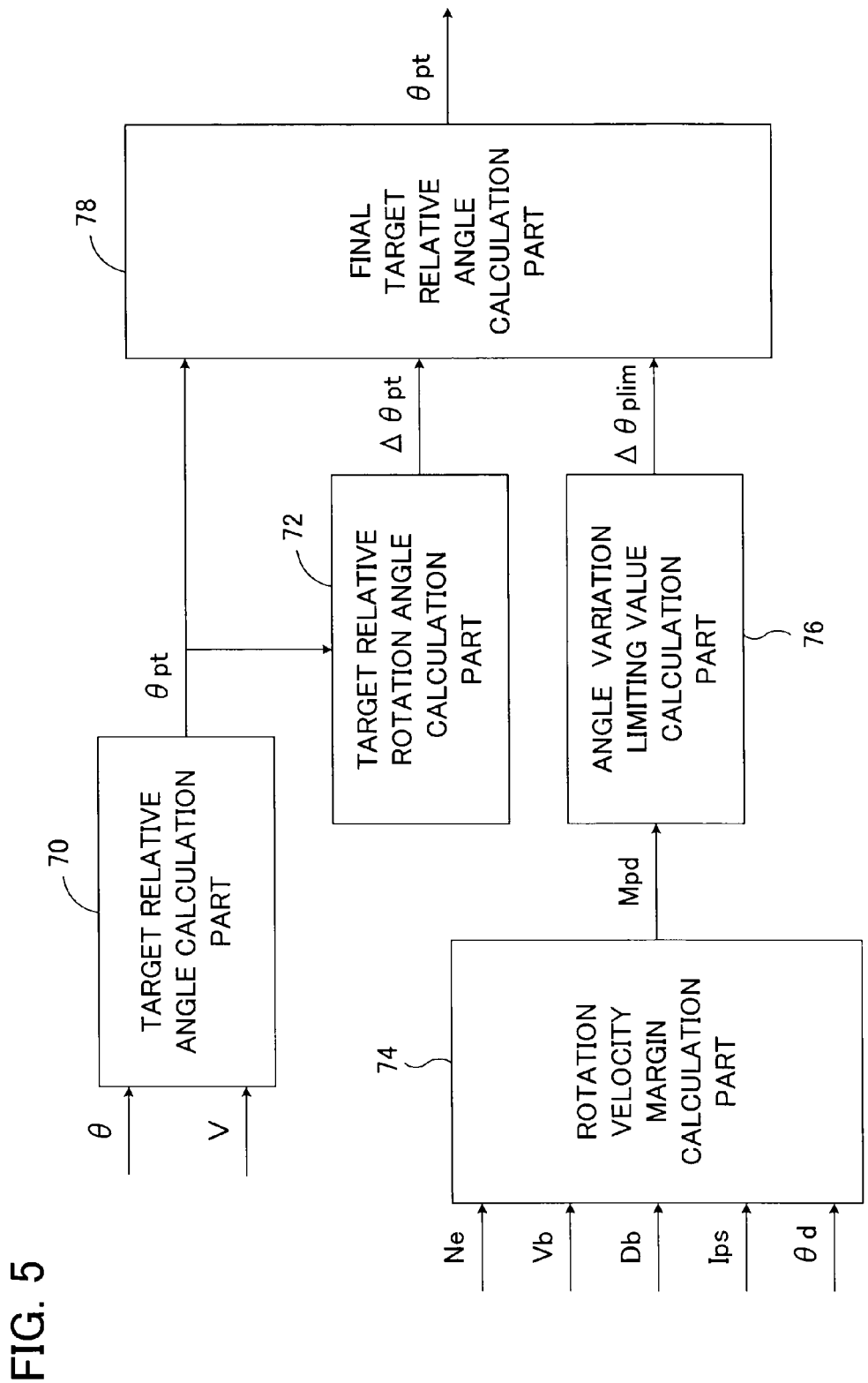
FIG. 5 is a functional block diagram of the steering ratio control unit in the steering control device according to the first embodiment.
Figure 6:
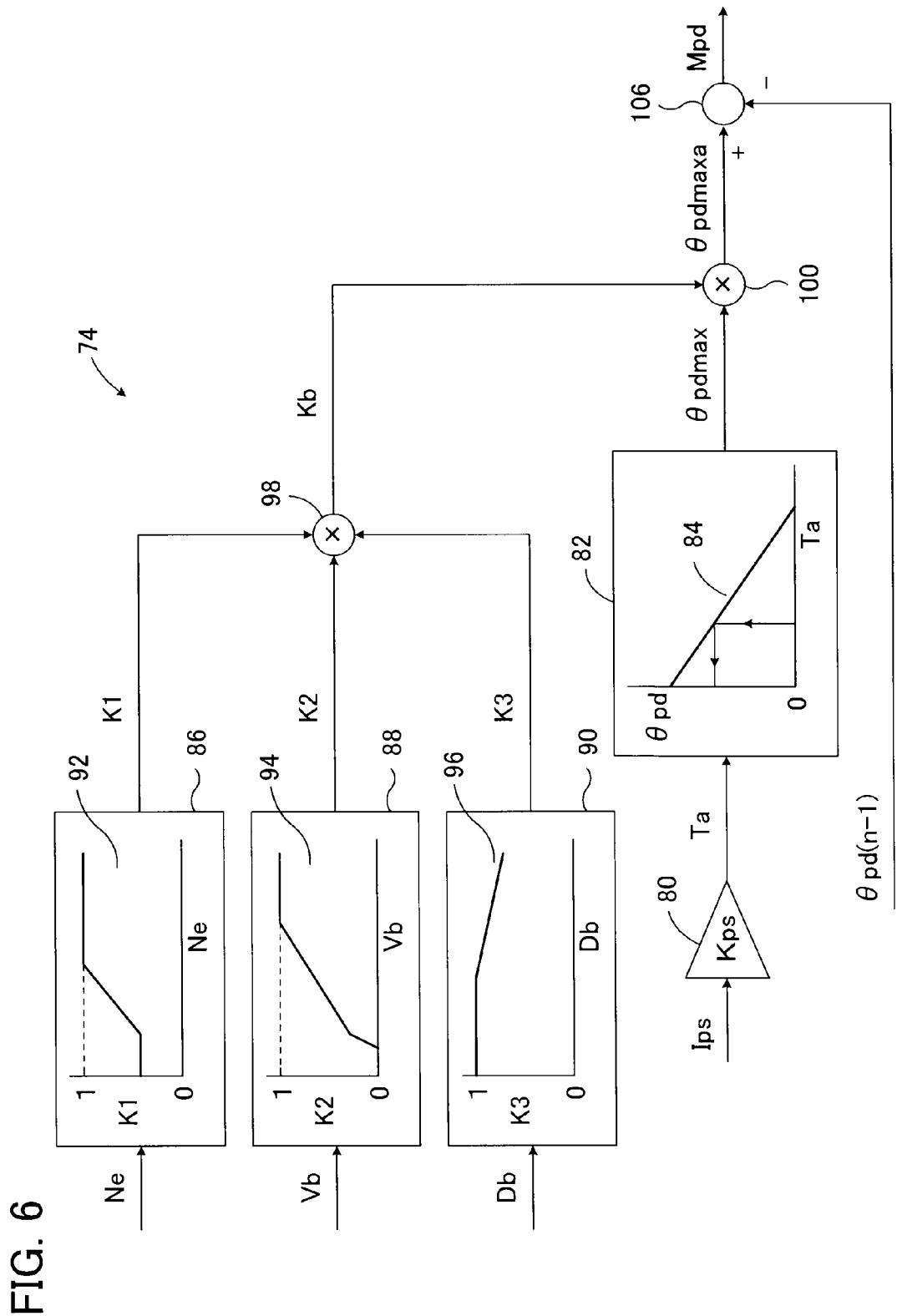
FIG. 6 is a functional block diagram showing in detail the rotation velocity margin calculation part shown in FIG. 5.
Figure 7:
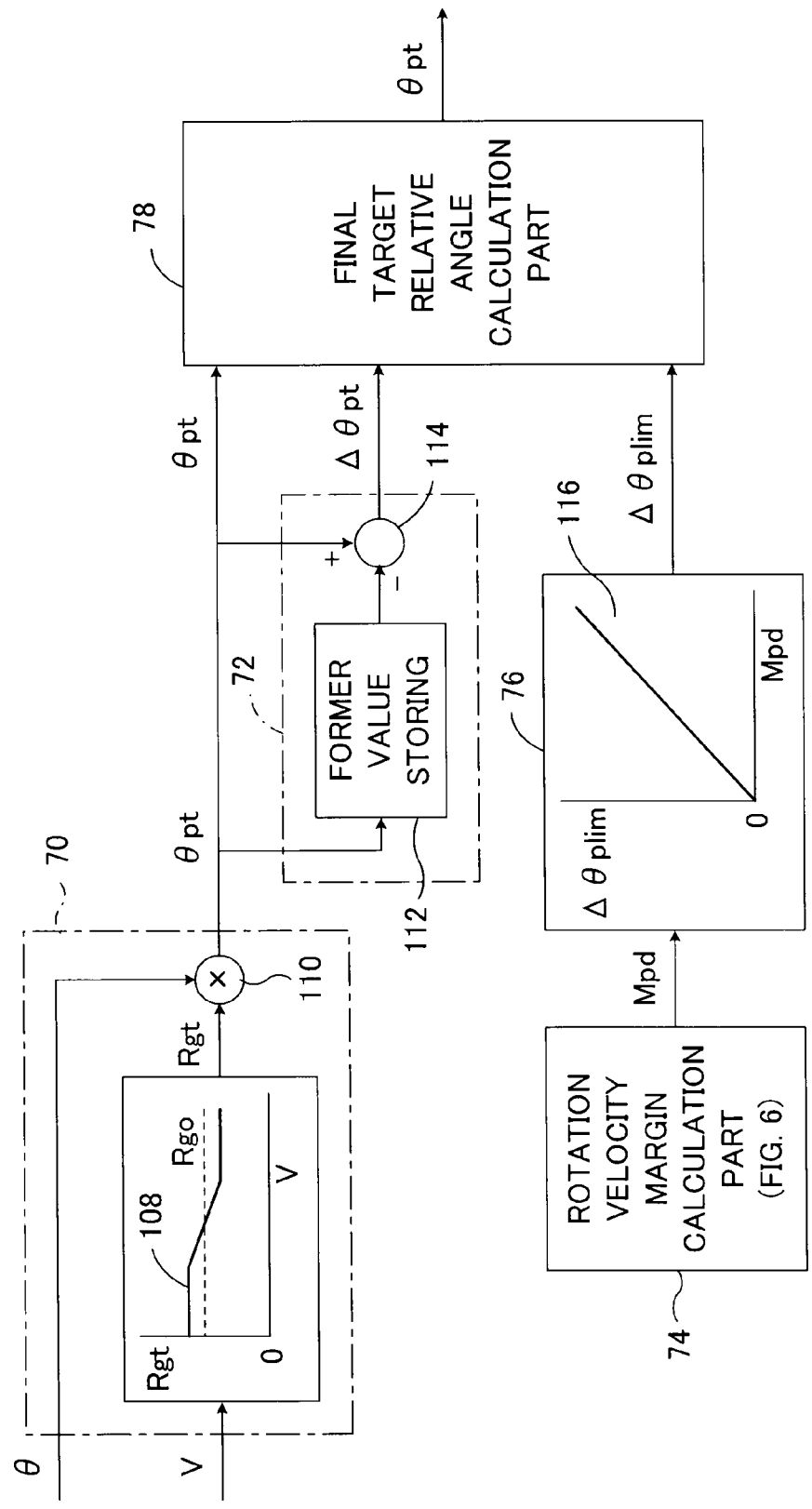
FIG. 7 is a functional block diagram showing in detail the target relative rotation angle calculation part, the angle variation limiting value calculation part, and the final target rotation angle calculation part shown in FIG. 5.
Figure 8:
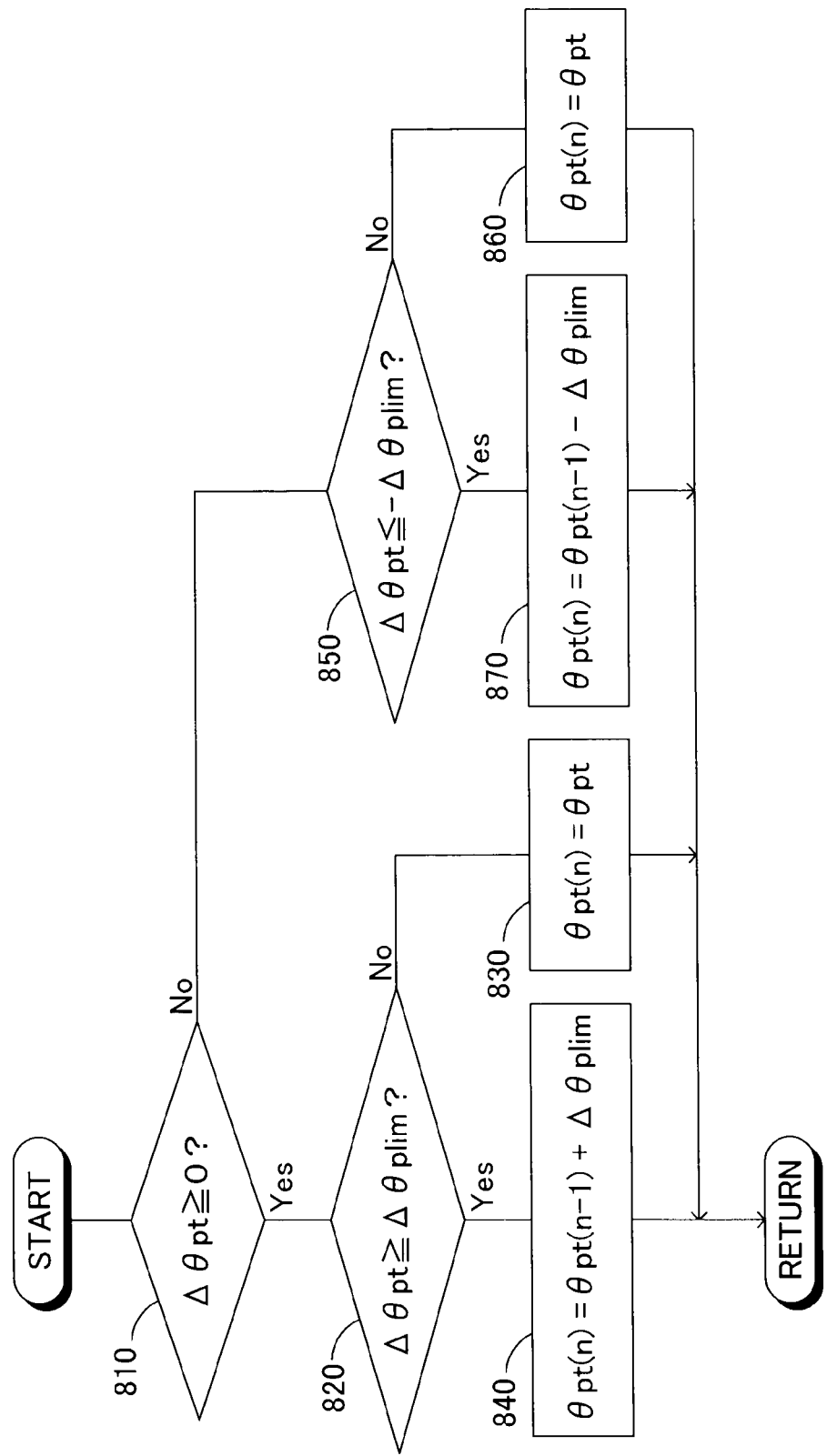
FIG. 8 is a flowchart showing a target angle limiting routine executed by a target angle limiting part of the final target rotation angle calculation part shown in FIG. 5.

FIG. 5 is a functional block diagram of the steering ratio control unit 20 in the steering control device 10 according to the first embodiment; FIG. 6 is a functional block diagram showing in detail the rotation velocity margin calculation part shown in FIG. 5; FIG. 7 is a functional block diagram showing in detail the target relative rotation angle calculation part, the angle variation limiting value calculation part, and the final target rotation angle calculation part shown in FIG. 5; and FIG. 8 is a flowchart showing a target angle limiting routine executed by a target angle limiting part of the final target rotation angle calculation part shown in FIG. 5. It is to be noted that the controls by the functional blocks shown in FIGS. 5-7 and the control according to the flowchart shown in FIG. 8 are started when an ignition switch not shown in the figures is turned on and is repeatedly executed at predetermined intervals.

As shown in FIG. 5, the steering ratio control unit 20 has a target relative angle calculation part 70, a target relative angle variation value calculation part 72, a rotation velocity margin calculation part 74, an angle variation limiting value calculation part 76, and a final target relative angle calculation part 78.

As will be described in detail hereinafter, the target relative angle calculation part 70 calculates a target relative angle θpt of the lower steering shaft 40 relative to the upper steering shaft 38 on the basis of a steering angle θ and a vehicle speed V. The target relative angle variation value calculation part 72 calculates a deviation between a target relative angle θpt and an actual relative angle θpa to thereby derive a target angle variation value Δθpt of the lower steering shaft 40. The rotation velocity margin calculation part 74 calculates a rotation velocity margin Mpd on the basis of an assist electric current Ips, a steering angle velocity θd which is a temporal differentiation value of a steering angle θ, and the like.

The angle variation limiting value calculation part 76 calculates an angle variation limiting value per unit time Δθplim of the lower steering shaft 40 on the basis of the rotation velocity margin Mpd. The final target relative angle calculation part 78 calculates a final target relative angle θpt of the lower steering shaft 40 relative to the upper steering shaft 38 on the basis of a target relative angle θpt of the lower steering shaft 40 relative to the upper steering shaft 38, a target angle variation value Δθpt of the lower steering shaft 40, and the angle variation limiting value Δθplim.

As shown in FIG. 6, the rotation velocity margin calculation part 74 has a multiplier 80. The multiplier 80 multiplies an assist electric current Ips by a torque constant Kps to thereby derive an assist torque Ta of the power steering unit 14. The assist torque Ta is input to a maximum allowable rotation velocity calculation part 82. The maximum allowable rotation velocity calculation part 82 calculates a maximum allowable rotation velocity θpdmax of the lower steering shaft 40 from a map 84 on the basis of the assist torque Ta. It is to be noted that the map 84 is a stored information of the relationship between an assist torque Ta and a maximum allowable rotation velocity θpdmax, and corresponds to FIG. 2.

As shown in FIG. 6, the rotation velocity margin calculation part 74 also has a correction coefficient calculation parts 86, 88 and 90. The correction coefficient calculation part 86 has a map 92 which stores the relationship between an engine speed V and a correction coefficient K1 and calculates a correction coefficient K1 from the map 92 on the basis of an engine speed V so that the coefficient is smaller when an engine speed V is low as compared with a case where an engine speed V is high.

The correction coefficient calculation part 88 has a map 94 which stores the relationship between a voltage Vb of the power source 60 and a correction coefficient K2 and calculates a correction coefficient K2 from the map 94 on the basis of a voltage Vb so that the coefficient is smaller when a voltage Vb is low as compared with a case where a voltage Vb is high. The correction coefficient calculation part 90 has a map 96 which stores the relationship between a degradation level Db of the battery in the power source 60 and a correction coefficient K3 and calculates a correction coefficient K3 from the map 96 on the basis of a degradation level Db so that the coefficient is smaller when a degradation level Db is high as compared with a case where a degradation level Db is low.

It is to be noted that the correction coefficients K1 and K3 are larger than 0 and are not larger than 1 and the correction coefficients K2 is not smaller than 0 and is not larger than 1. The correction coefficient K1 is a correction coefficient for compensating a state in which an alternator not shown in the figures generates electricity and the correction coefficients K2 and K3 are correction coefficients for compensating electric energy supplying capacity of the power source 60.

The correction coefficients K1-K3 are multiplied by each other to thereby calculate a correction coefficient Kb which is based on an engine speed Ne, a voltage Vb of the power source 60 and a degradation level Db of the battery in the power source 60, i.e. a correction coefficient for compensating an electric energy which the power source 60 can supply. The correction coefficient Kb is multiplied by a multiplier 100 by a maximum allowable rotation velocity θpdmax calculated by the maximum allowable rotation velocity calculation part 82, to thereby calculate a corrected maximum allowable rotation velocity θpdmaxa.

Further, the rotation velocity margin calculation part 74 has an adder 106. The adder 106 subtract a former cycle relative rotation velocity θpd(n−1) of the lower steering shaft 40 from the corrected maximum allowable rotation velocity θpdmaxa, to thereby calculate a rotation velocity margin Mpd which indicates a rotation velocity allowance level of the lower steering shaft 40.

As shown in FIG. 7, the target relative angle calculation part 70 calculates a target steering gear ratio Rgt from a map 108 on the basis of a vehicle speed V. It is to be noted that the map 108 is a stored information of the relationship between a vehicle speed V and a target steering gear ratio Rgt wherein a target steering gear ratio Rgt is larger than the standard value Rgo in an area where a vehicle speed V is low and a target steering gear ratio Rgt is lower than the standard value Rgo in an area where a vehicle speed V is high. The target steering gear ratio Rgt is multiplied by a steering angle θ by a multiplier 110 to thereby calculate a target relative angle θpt of the lower steering shaft 40.

The target relative angle θpt is fed to the final target relative angle calculation part 78 and a former cycle value storing part 112 of the target relative angle variation value calculation part 72. The former value storing part 112 stores the target relative rotation angle θpt for a next cycle. A former cycle value θpt(n−1) of the target relative angle θpt stored in the former cycle value storing part 112 is read out and is subtracted from a present cycle value θpt(n) by an adder 114 to thereby calculate a target angle variation value Δθpt of the lower steering shaft 40.

The angle variation limiting value calculation part 76 has a map 116 which stores a relationship between a rotation velocity margin Mpd and an angle variation limiting value per unit time Δθplim of the lower steering shaft 40 relative to the upper steering shaft 38. The angle variation limiting value calculation part 76 calculates an angle variation limiting value Δθplim on the basis of a rotation velocity margin Mpd so that the angle variation limiting value Δθplim increases as the rotation velocity margin Mpd increases.

The final target relative angle calculation part 78 calculates a final target relative angle θpt(n) of the lower steering shaft 40 relative to the upper steering shaft 38 according to the flowchart shown in FIG. 8.

First, in step 810, a decision is made as to whether or not a target angle variation value Δθpt is not less than 0 with the lower steering shaft 40 being defined to be rotated relative to the upper steering shaft 38 in a direction in which the vehicle is turned to left, for example, when target angle variation value Δθpt is positive. When a negative decision is made, the control proceeds to step 850, whereas when an affirmative decision is made, the control proceeds to step 820.

In step 820, a decision is made as to whether or not a target angle variation value Δθpt is larger than the angle variation limiting value Δθplim, i.e. as to whether or not there is a possibility that a steering drive velocity in magnitude of the left and right front wheels is so high that a power assistance failure may occur. When a negative decision is made, a final target relative angle θpt(n) is set to a target relative angle θpt in step 830, whereas when an affirmative decision is made, a final target relative angle θpt(n) is set to a value in which the angle variation limiting value Δθplim is added to a former cycle target relative angle θpt(n−1) in step 840.

In step 850, a decision is made as to whether or not a target angle variation value Δθpt is smaller than the sign inversion value −Δθplim of the angle variation limiting value Δθplim, i.e. as to whether or not there is a possibility that a steering drive velocity in magnitude of the left and right front wheels is so high that a power assistance failure may occur. When a negative decision is made, a final target relative angle θpt(n) is set to a target relative angle θpt in step 860, whereas when an affirmative decision is made, a final target relative angle θpt(n) is set to a value in which the angle variation limiting value Δθplim is subtracted from a former cycle target relative angle θpt(n−1) in step 870.

Thus, the final target relative angle calculation part 78 modifies a target relative angle θpt so that a target angle variation value Δθpt is decreased in magnitude to the angle variation limiting value Δθplim when a target angle variation value Δθpt exceeds in magnitude the angle variation limiting value Δθplim, whereas it does not modify a target relative angle θpt when a target angle variation value Δθpt does not exceed in magnitude the angle variation limiting value Δθplim.

As is apparent from the above, according to the first embodiment, a maximum allowable rotation velocity θpdmax of the lower steering shaft 40 is calculated on the basis of an assist torque Ta and the like. A deviation θpdmax−θpd between the maximum allowable rotation velocity θpdmax of the lower steering shaft 40 and an actual rotation velocity θpd of the lower steering shaft 40 is calculated to thereby calculate a rotation velocity margin Mpd. An angle variation limiting value per unit time Δθplim of the lower steering shaft 40 is calculated so that the limiting value decreases as the rotation velocity margin Mpd decreases. A target angle variation limiting value per unit time Δθpt is calculated which is based on the deviation between a target relative angle θpt of the lower steering shaft 40 and an actual relative angle θpa.

Further, the target relative angle θpt is modified as necessary so that the target angle variation value Δθpt does not exceed in magnitude the angle variation limiting value Δθplim. The electric motor 46 of the steering ratio varying unit 16 is controlled so that an actual relative angle θpa of the lower steering shaft 40 conforms to a target angle variation value Δθpt.

Therefore, it is possible to positively prevent the target angle variation value Δθpt from exceeding in magnitude the angle variation limiting value Δθplim and to positively prevent the power steering unit 14 from being unable to generate a required assist torque due to the exceeding. Accordingly, a power assistance failure can positively be prevented from occurring even in the case where a rapid steering operation is conducted at a middle or high vehicle speed as in the case of an urgent steering for avoiding danger.

Figure 26:
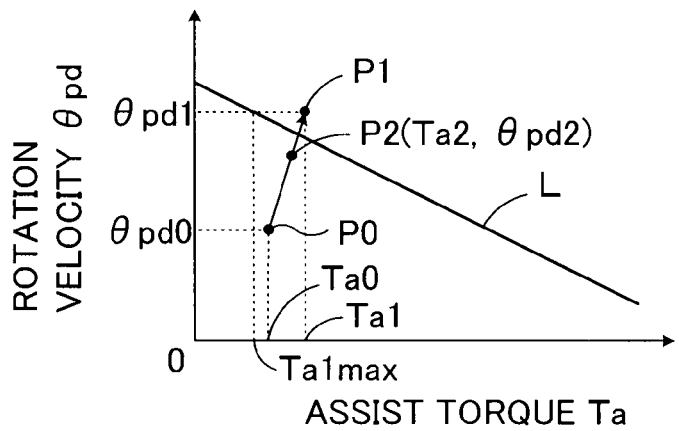
FIG. 26 is an explanatory view showing an example of changes of rotation velocity θpd and assist torque Ta in a conventional steering control device and the first embodiment with respect to the situation where a rapid steering operation is conducted by a driver.

For example, a case is now considered in which a very rapid steering operation is conducted by a driver as in the case of an urgent steering for avoiding danger under the situation where the magnitude of a rotation velocity θpd of the lower steering shaft 40 and an assist torque Ta of the power steering unit 14 assume values (θpdo and Tao, respectively) of a point Po shown in FIG. 26.

It is now supposed that the magnitude of a rotation velocity θpd of the lower steering shaft 40 rapidly increases to a value θpd1 above a line L indicating a maximum value and in connection with this change the magnitude of an assist torque Ta which the power steering unit 14 is required to generate varies from Tao to Ta1. That is, a point indicating a rotation velocity θpd of the lower steering shaft 40 and an assist torque Ta of the power steering unit 14 is supposed to move to a position shown by a point P1 in FIG. 26. It is also supposed that a maximum assist torque Ta which the power steering unit 14 can generate when a rotation velocity θpd of the lower steering shaft 40 is θpd1 assumes Ta1max.

In a conventional steering control device in which the control according to the first embodiment is not executed, the magnitude of an assist torque Ta which the power steering unit 14 is required to generate assumes a value larger than the maximum value Ta1max, resulting in that the power steering unit 14 can not generate a required assist torque Ta1 and a power assistance failure can occur.

By contrast, according to the first embodiment, as a very rapid steering operation such as an urgent steering for avoiding danger is started by a driver and a rotation velocity θpd of the lower steering shaft 40 increases, the rotation velocity margin Mpd is decreased. Accordingly, an angle variation limiting value per unit time Δθplim of the lower steering shaft 40 relative to the upper steering shaft 38 is decreased and a target angle variation value per unit time Δθpt of the lower steering shaft 40 relative to the upper steering shaft 38 is limited in magnitude by the angle variation limiting value Δθplim. Therefore, the rotation velocity θpd of the lower steering shaft 40 is suppressed from increasing so that the rotation velocity θpd and the assist torque Ta which the power steering unit 14 is required to generate do not exceed in magnitude the line L indicating a possible maximum value.

By means of the suppression of the rotation velocity θpd as above, a point indicating a rotation velocity θpd of the lower steering shaft 40 and an assist torque Ta of the power steering unit 14 moves to a point P2 (Ta2, θpd2) which is on the side of the origin with respect to the line L in FIG. 26. Consequently, although an assist torque Ta of the power steering unit 14 becomes lower than a value Ta1 which the power steering unit 14 is required to generate, a power assistance failure can positively be prevented from occurring in the situation where a very rapid steering operation is conducted.

Second Embodiment

Figure 9:
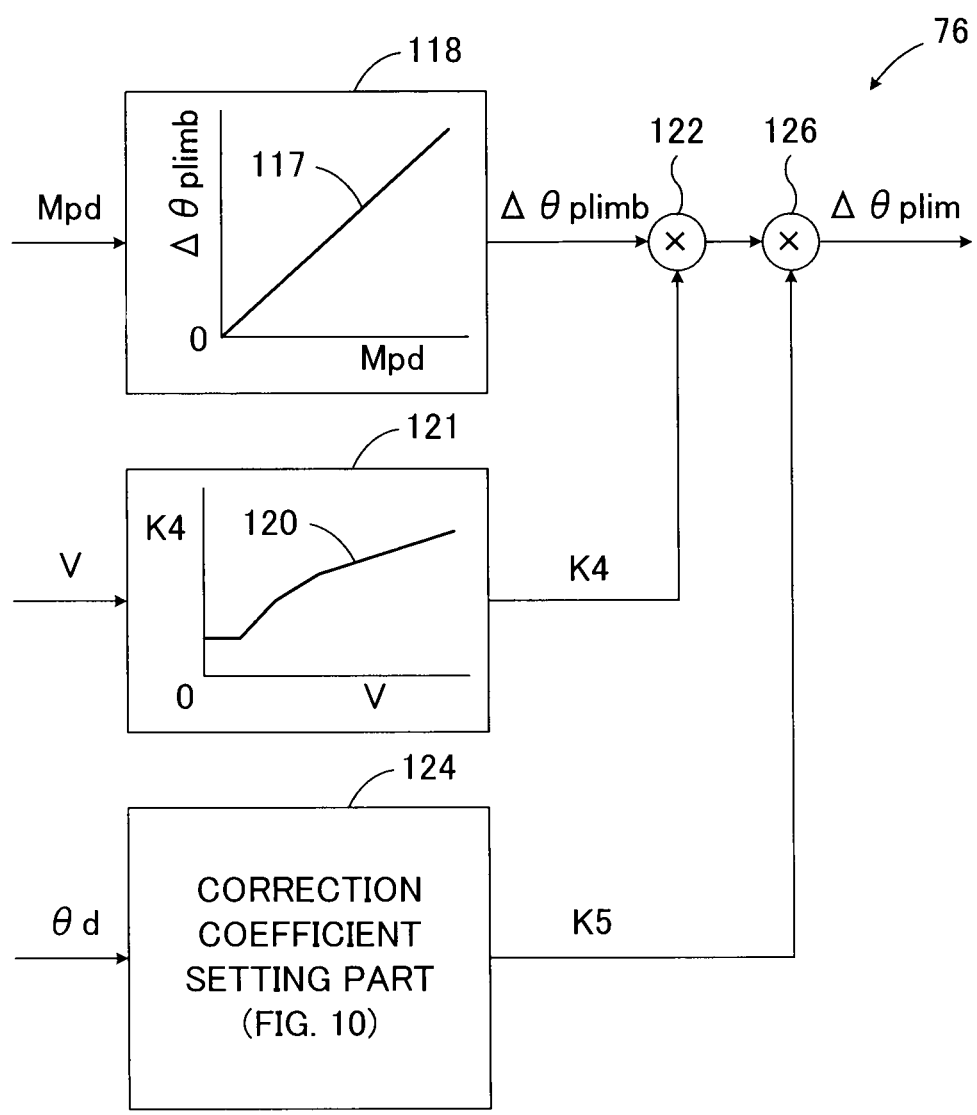
FIG. 9 is a functional block diagram showing the angle variation limiting value calculation part in a second embodiment of a vehicle steering control device according to the present invention.

FIG. 9 is a functional block diagram showing the angle variation limiting value calculation part in a second embodiment of a vehicle steering control device according to the present invention which is configured as a modification of the first embodiment. It is to be noted that in this second embodiment, the controls other than the control of the functional block diagram shown in FIG. 9 are executed similarly to those in the above-described first embodiment.

In this second embodiment, the angle variation limiting value calculation part 76 has a basic angle variation limiting value calculation block 118 having a map 117 corresponding to a map 116 in the first embodiment. The basic angle variation limiting value calculation block 118 calculates a basic angle variation limiting value Δθplimb from the map 117 on the basis of the rotation velocity margin Mpd. The angle variation limiting value calculation part 76 also has a correction coefficient calculation block 121 having a map 120 storing the relationship between a vehicle speed V and a correction coefficient K4. The correction coefficient calculation block 121 calculates a correction coefficient K4 from the map 120 on the basis of a vehicle speed V so that the coefficient is smaller when a vehicle speed V is low as compared with a case where a vehicle speed V is high. The correction coefficient K4 is multiplied by the basic angle variation limiting value Δθplimb by a multiplier 122.

The angle variation limiting value calculation part 76 has a correction coefficient setting part 124. The correction coefficient setting part 124 sets a correction coefficient K5 according to the flowchart shown in FIG. 10 so that the coefficient is smaller when a steering operation is conducted quickly by a driver as compared with the case where a steering operation is conducted slowly by a driver. The correction coefficient K5 is multiplied by the output value K4·Δθplimb of the multiplier 122 by a multiplier 126 and the resultant value K4K5Δθplimb is fed to the final target relative angle calculation part 78 as an angle variation limiting value Δθplim.

Next, a routine for setting the correction coefficient K5 in the correction coefficient setting part 124 will be described with reference to the flowchart shown in FIG. 10.

First, in step 1010, a decision is made as to whether or not the absolute value of a steering angle velocity θd is not less than a reference value θda for determining a rapid steering. When an affirmative decision is made, in step 1020 a flag Fs indicating a rapid steering is set to ON and a return counter Cr is reset to 0. To the contrary, when a negative decision is made, in step 1030 the return counter Cr is incremented by 1 and subsequently the control proceeds to step 1040.

In step 1040, a decision is made as to whether or not the return counter Cr is larger than a reference value Cra for ensuring a stability of the vehicle. When an affirmative decision is made, the flag Fs is set to OFF in step 1050, whereas when a negative decision is made, the control proceeds to step 1060 without altering the flag Fs.

In step 1060, a decision is made as to whether or not the flag Fs is ON. When a negative decision is made, in step 1070 the correction coefficient K5 is set to 1 which is a standard value, whereas when an affirmative decision is made, in step 1080 the correction coefficient K5 is set to a predetermined constant value A which is larger than 0 and smaller than 1.

Thus, according to the second embodiment, as in the first embodiment, a power assistance failure can positively be prevented from occurring even in the situation where a rapid steering operation is conducted at a middle or high vehicle speed as in the case of an urgent steering for avoiding danger.

According to the second embodiment, in particular, the correction coefficient K4 is calculated on the basis of a vehicle speed V so that the coefficient is smaller when a vehicle speed V is low as compared with a case where a vehicle speed V is high and the angle variation limiting value Δθplim is multiplied by the correction coefficient K4 to thereby modify the angle variation limiting value Δθplim. Accordingly, it is possible to early determine a situation where a rapid steering operation is conducted by a driver and to early reduce the angle variation limiting value Δθplim.

Third Embodiment

Figure 11:
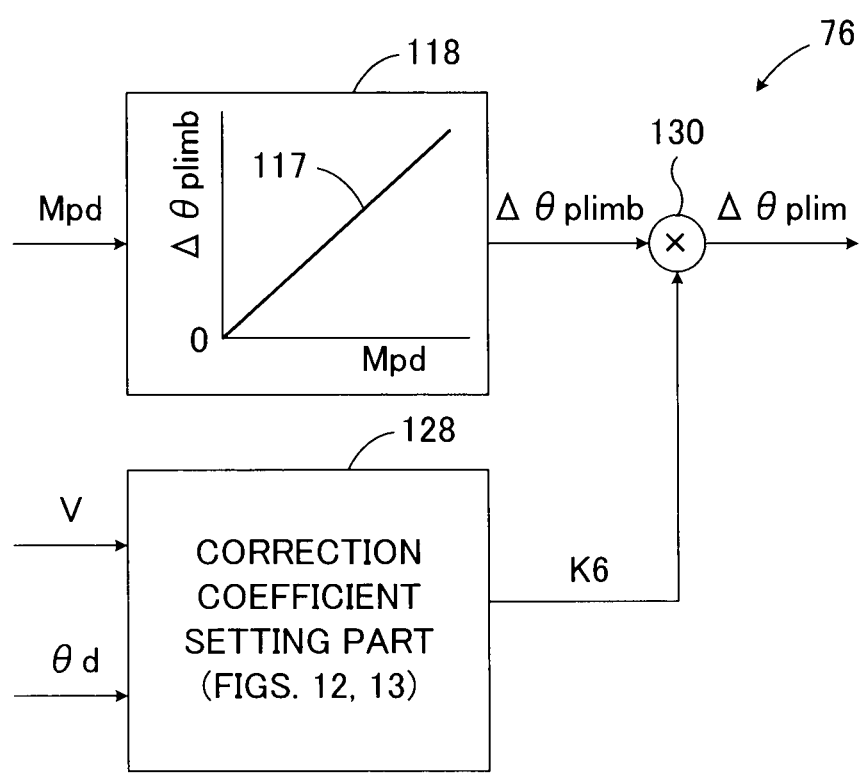
FIG. 11 is a functional block diagram of the angle variation limiting value calculation part in the third embodiment of a steering control device according to the present invention.

FIG. 11 is a functional block diagram showing the angle variation limiting value calculation part in a third embodiment of a vehicle steering control device according to the present invention which is configured as a modification of the first embodiment. It is to be noted that in this third embodiment, the controls other than the control of the functional block diagram shown in FIG. 11 are executed similarly to those in the above-described first embodiment.

In this third embodiment, as in the second embodiment, the angle variation limiting value calculation part 76 has a basic angle variation limiting value calculation block 118. The basic angle variation limiting value calculation block 118 calculates a basic angle variation limiting value Δθplimb from the map 117 on the basis of the rotation velocity margin Mpd. The angle variation limiting value calculation part 76 also has a correction coefficient setting part 128. The correction coefficient setting part 128 sets a correction coefficient K6 according to the flowcharts shown in FIGS. 12 and 13 so that the coefficient is smaller when a steering operation is conducted over a large angular range by a driver at a low vehicle speed as in the case of a stationary steering or a rapid steering operation is conducted by a driver at a middle or high vehicle speed as in the case of an urgent steering for avoiding danger as compared with the case where those steerings are not conducted. The correction coefficient K6 is multiplied by the basic angle variation limiting value Δθplimb by a multiplier 130 and the resultant value K6·Δθplimb is fed to the final target relative angle calculation part 78 as an angle variation limiting value Δθplim.

Figure 12:
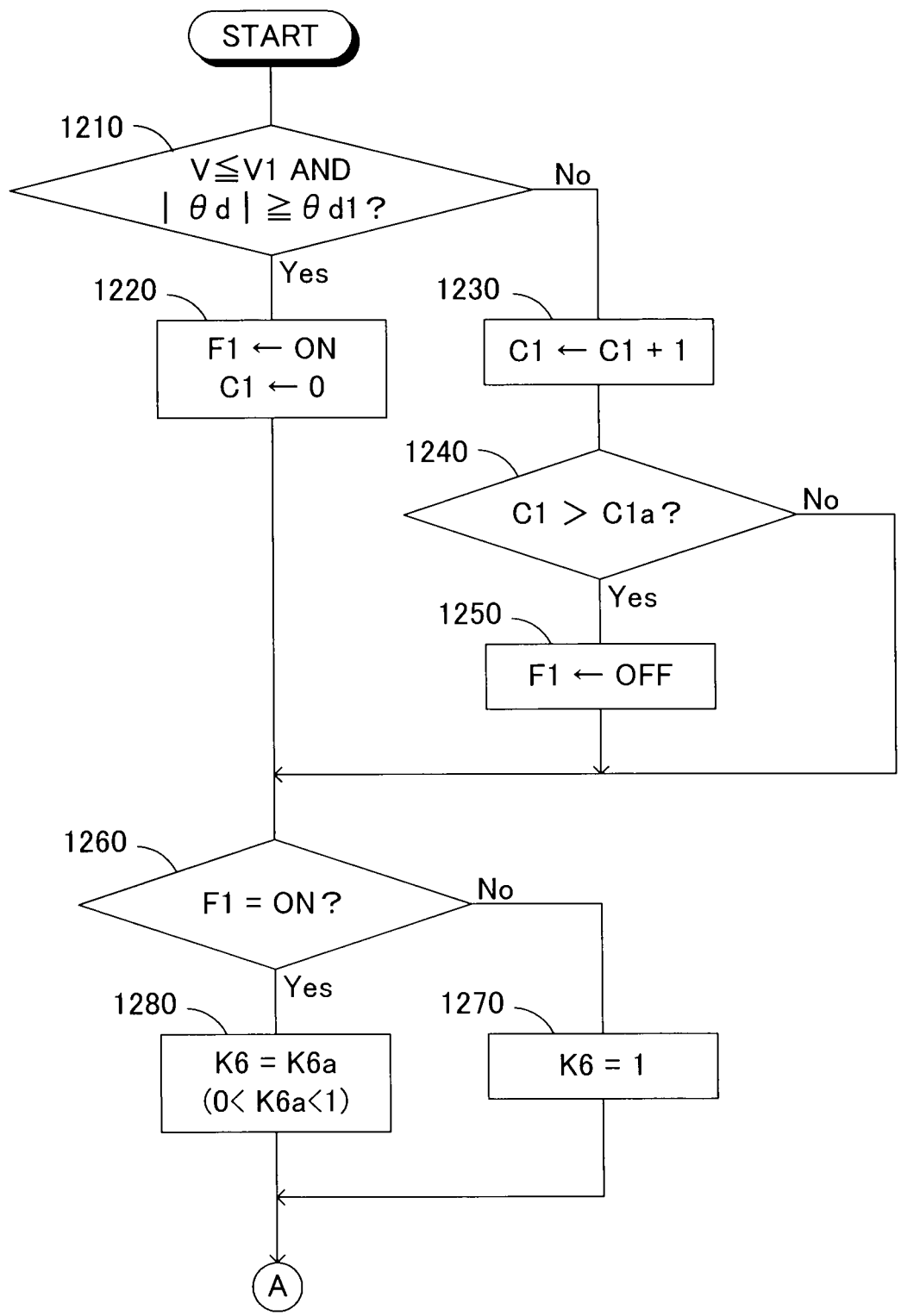
FIG. 12 is a flowchart showing a first half of the routine for setting the correction coefficient K6.
Figure 13:
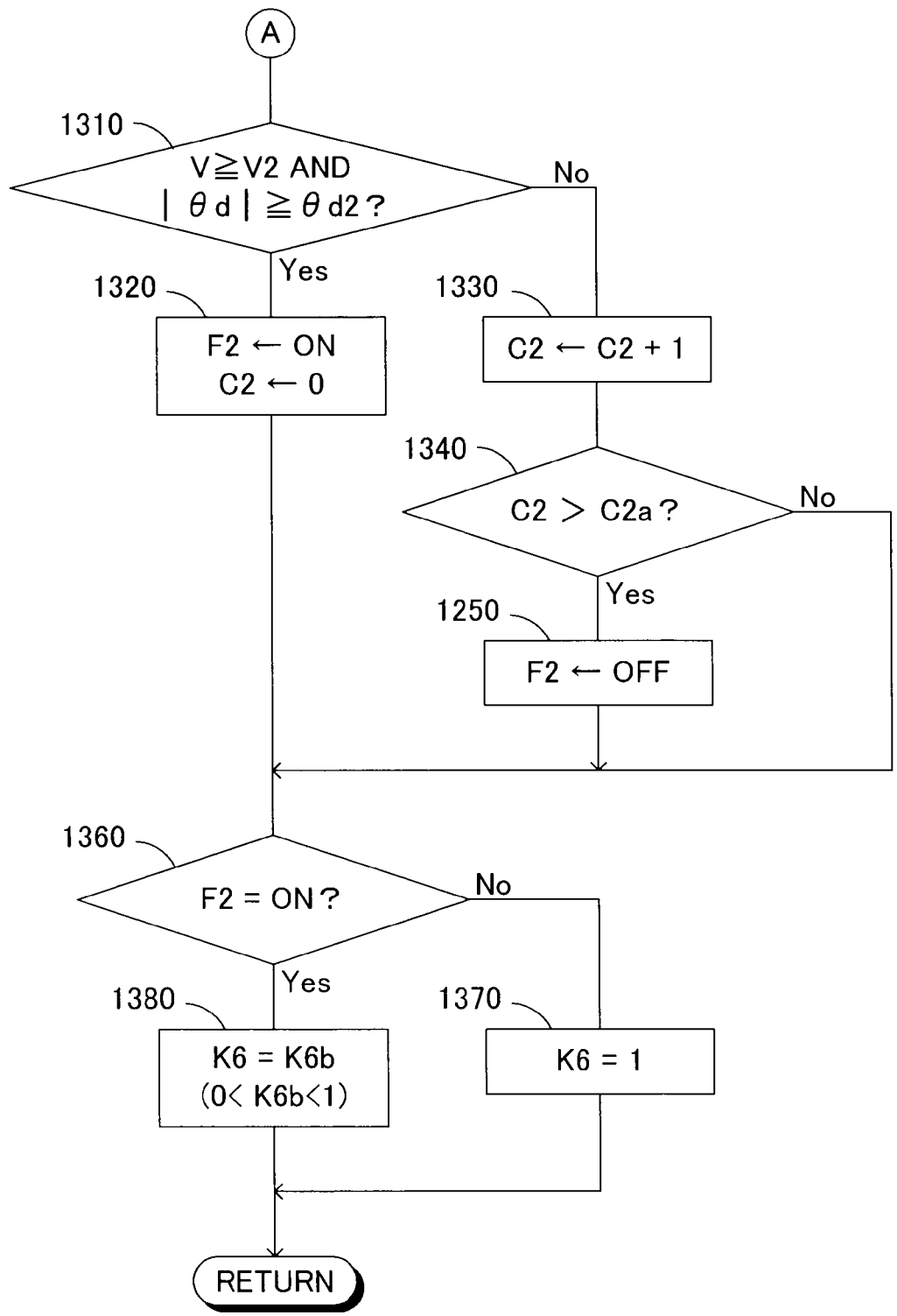
FIG. 13 is a flowchart showing a latter half of the routine for setting the correction coefficient K6.

Next, a routine for setting the correction coefficient K6 will be described with reference to the flowcharts shown in FIGS. 12 and 13.

First, in step 1210, a decision is made as to whether or not a vehicle speed V is not more than a first reference value V1 (a positive constant) and the absolute value of a steering angle velocity θd is not less than a first reference value θd1 (a positive constant). When an affirmative decision is made, in step 1220 a flag F1 indicating a steering over a large angular range is set to ON and a return counter C1 is reset to 0. To the contrary, when a negative decision is made, in step 1230 the return counter C1 is incremented by 1 and subsequently the control proceeds to step 1240.

In step 1240, a decision is made as to whether or not the return counter C1 is more than a reference value C1a (a positive constant) for positively preventing a power assistance failure from occurring. When an affirmative decision is made, the flag F1 is set to OFF in step 1250, whereas when a negative decision is made, the control proceeds to step 1260 without altering the flag F1.

In step 1260, a decision is made as to whether or not the flag F1 is ON, i.e. as to whether or not measures are needed against a power assistance failure due to a steering over a large angular range at a low vehicle speed. When a negative decision is made, in step 1270 the correction coefficient K6 is set to 1 which is a standard value, whereas when an affirmative decision is made, in step 1280 the correction coefficient K6 is set to a predetermined value K6a which is larger than 0 and smaller than 1.

In step 1310, a decision is made as to whether or not a vehicle speed V is not more than a second reference value V2 (a positive constant larger than the first reference value V1) and the absolute value of a steering angle velocity θd is not less than a second reference value θd2 (a positive constant larger than the first reference value θd1). When an affirmative decision is made, in step 1320 a flag F2 indicating a rapid steering operation at a middle or high vehicle speed is set to ON and a return counter C2 is reset to 0. To the contrary, when a negative decision is made, in step 1330 the return counter C2 is incremented by 1 and subsequently the control proceeds to step 1340.

In step 1340, a decision is made as to whether or not the return counter C2 is more than a reference value C2a (a positive constant) for positively preventing a power assistance failure from occurring. When an affirmative decision is made, the flag F2 is set to OFF in step 1350, whereas when a negative decision is made, the control proceeds to step 1360 without altering the flag F2.

In step 1360, a decision is made as to whether or not the flag F2 is ON, i.e. as to whether or not measures are needed against a power assistance failure due to a rapid steering operation at a middle or high vehicle speed. When a negative decision is made, in step 1370 the correction coefficient K6 is set to 1 which is a standard value, whereas when an affirmative decision is made, in step 1380 the correction coefficient K6 is set to a predetermined value K6b which is larger than 0 and smaller than 1.

It is to be noted that the constants K6a and K6b may be set experimentally, for example, in accordance with the specifications of the power steering unit 14 and the steering ratio varying unit 16 so that a power assistance failure may be prevented from occurring due to a steering over a large angular range at a low vehicle speed and due to a rapid steering operation conducted at a middle or high vehicle speed, respectively, and the constants may be the same to each other.

Thus, according to the third embodiment, the correction coefficient K6 is variably set in accordance with a steering operation of a driver so that the coefficient is smaller when a steering operation is conducted over a large angular range by a driver at a low vehicle speed as in the case of a stationary steering or a rapid steering operation is conducted by a driver at a middle or high vehicle speed as in the case of an urgent steering for avoiding danger as compared with the case where those steerings are not conducted. And the angle variation limiting value Δθplim is modified by multiplying the angle variation limiting value Δθplim by the correction coefficient K6. Accordingly, a positive determination can be made as to situations where a steering operation is conducted over a large angular range by a driver at a low vehicle speed as in the case of a stationary steering or a rapid steering operation is conducted by a driver at a middle or high vehicle speed as in the case of an urgent steering for avoiding danger, and a power assistance failure can positively be prevented from occurring due to such steering operations.

Fourth Embodiment

Figure 14:
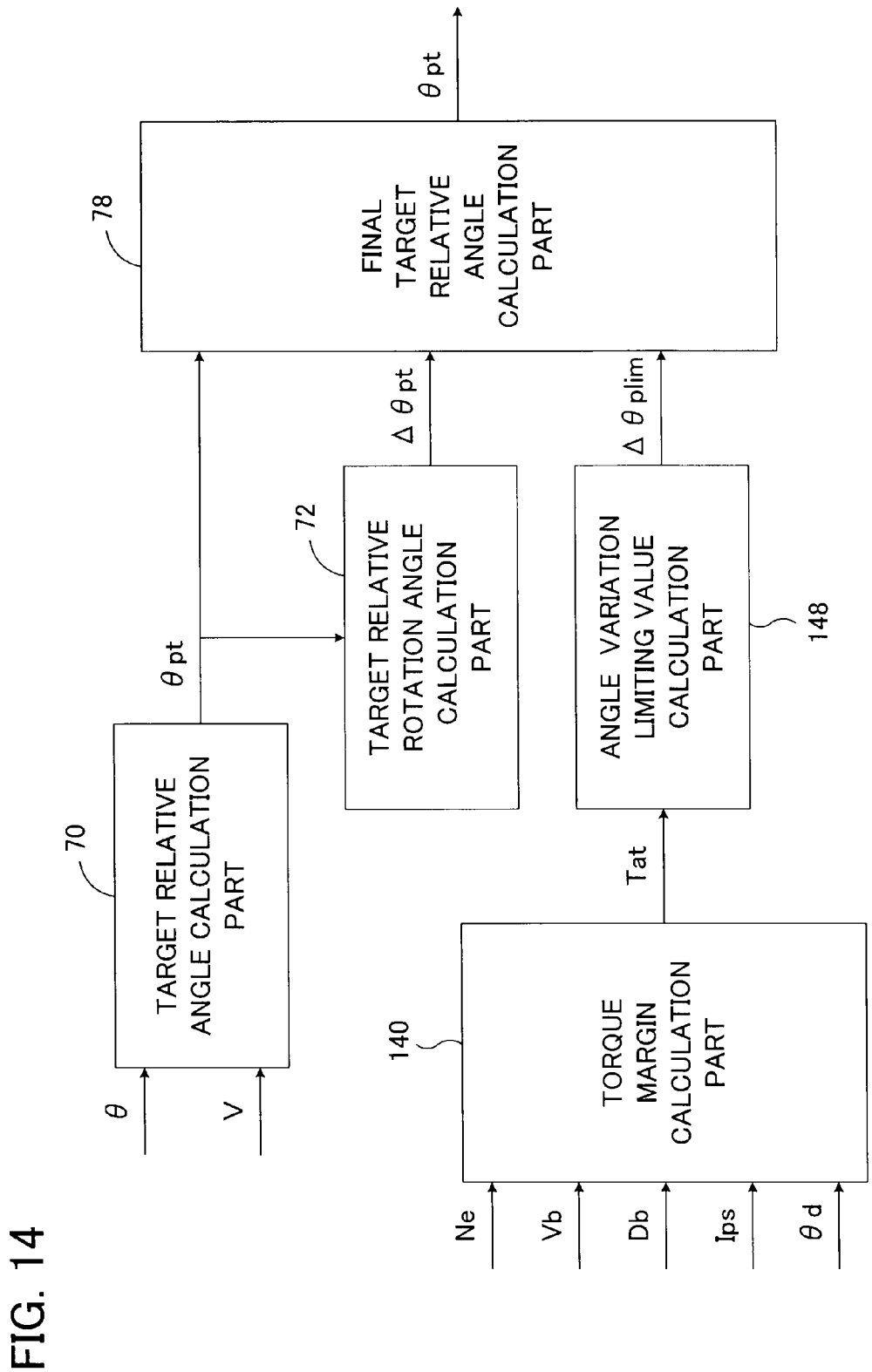
FIG. 14 is a functional block diagram of the steering ratio control unit in the fourth embodiment of a steering control device according to the present invention.
Figure 15:
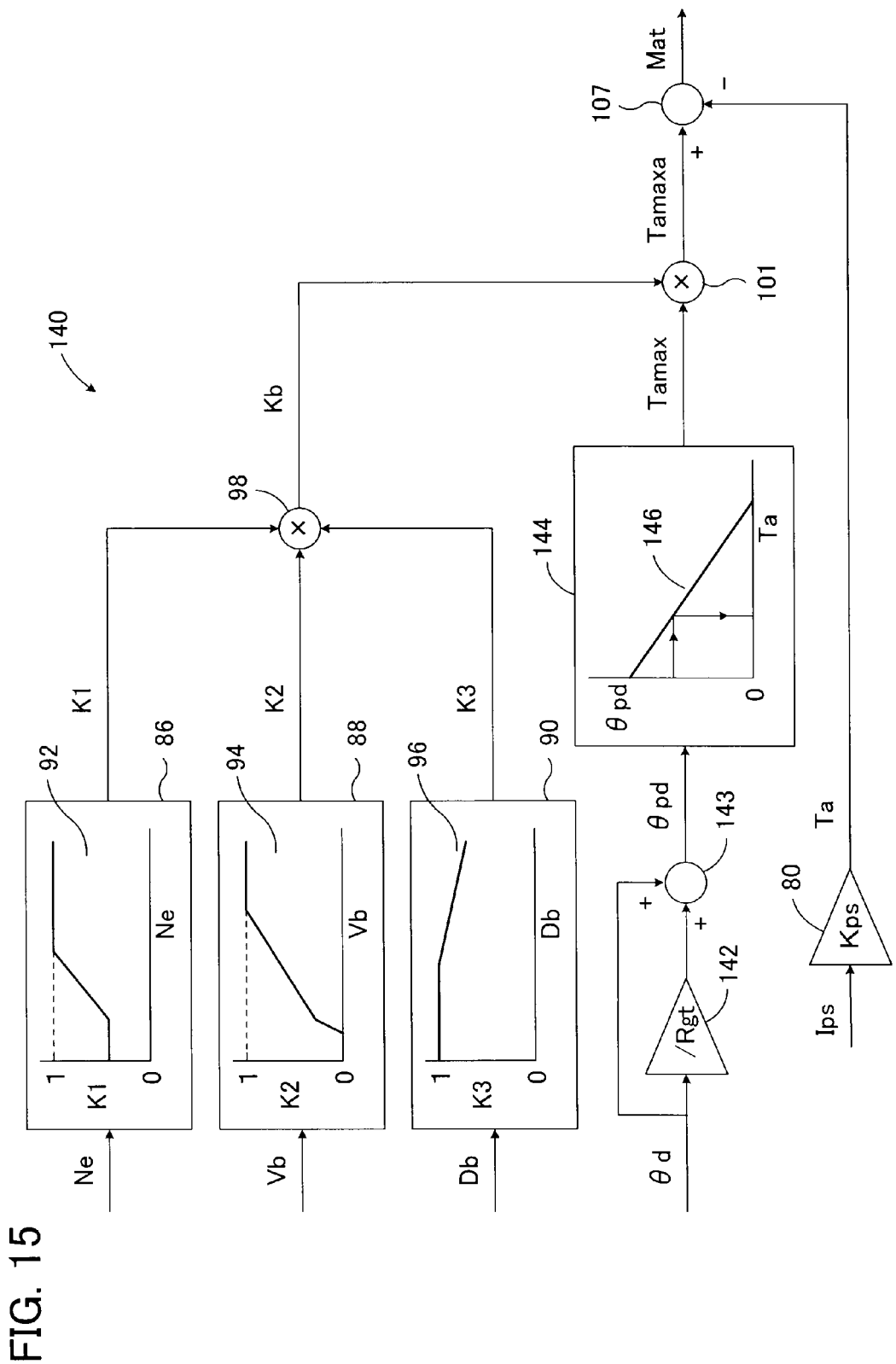
FIG. 15 is a functional block diagram showing in detail the torque margin calculation part shown in FIG. 14.
Figure 16:
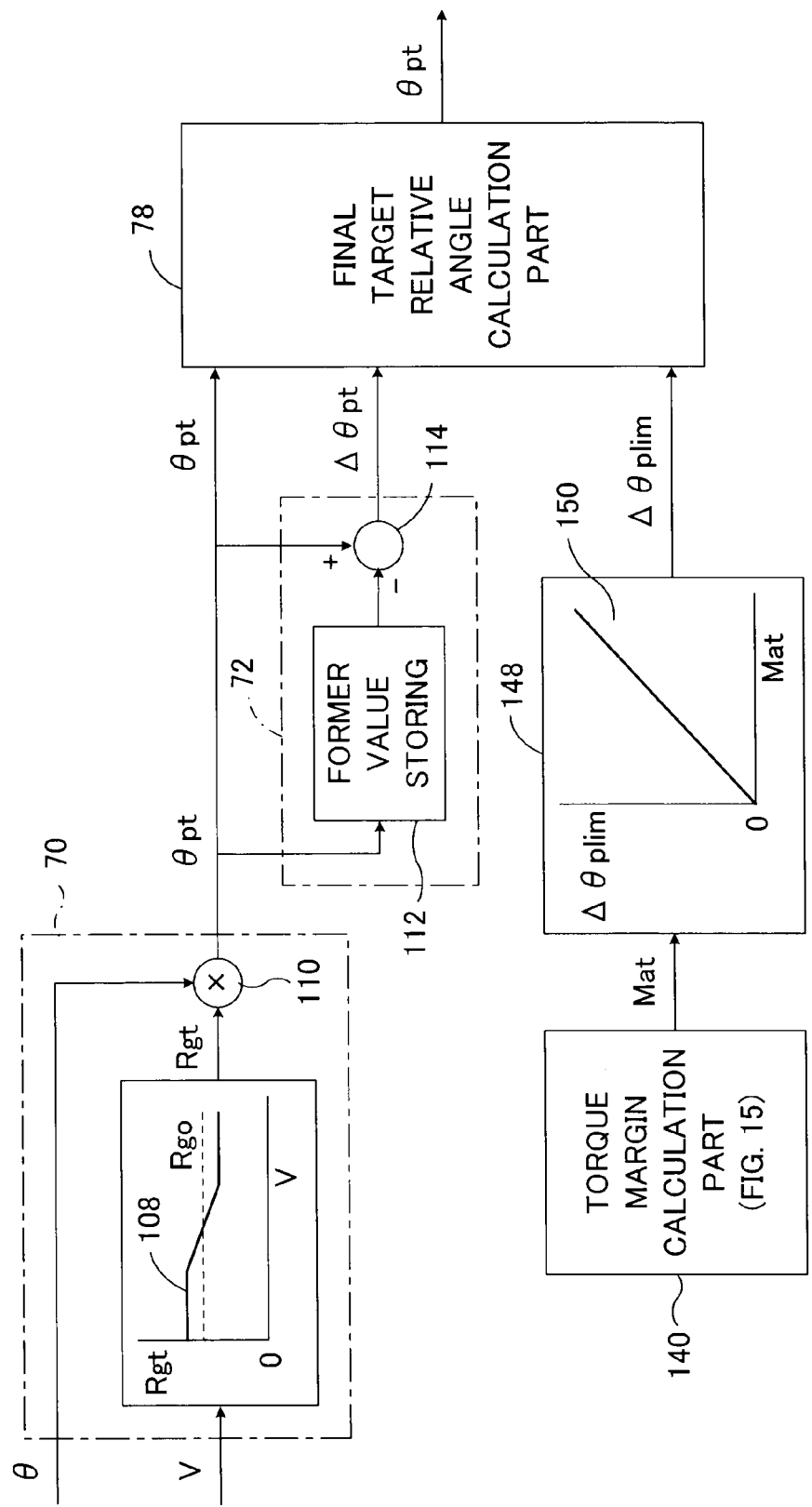
FIG. 16 is a functional block diagram showing in detail target relative rotation angle calculation part, the angle variation limiting value calculation part, and the final target rotation angle calculation part shown in FIG. 14.

FIG. 14 is a functional block diagram of the steering ratio control unit 20 in the steering control device according to the fourth embodiment; FIG. 15 is a functional block diagram showing in detail the torque margin calculation part shown in FIG. 14; and FIG. 16 is a functional block diagram showing in detail the target relative angle calculation part, the angle variation limiting value calculation part, and the final target angle calculation part shown in FIG. 14. It is to be noted that the controls by the functional blocks shown in FIGS. 14-16 are started when an ignition switch not shown in the figures is turned on and is repeatedly executed at predetermined intervals.

As shown in FIG. 14, in this fourth embodiment, a torque margin calculation part 140 replacing the rotation velocity margin calculation part 74 in the first embodiment calculates a torque margin Mat indicating an increase allowance level of an assist torque on the basis of an assist electric current Ips, a steering angle velocity θd which is a temporal differentiation value of a steering angle θ, and the like. And in this fourth embodiment, an angle variation limiting value calculation part 148 replacing the angle variation limiting value calculation part 76 calculates an angle variation limiting value per unit time Δθplim of the lower steering shaft 40 on the basis of the torque margin Mat. It should be noted that since in this fourth embodiment the controls in the target relative angle calculation part 70, the target relative angle variation value calculation part 72, and the final target relative angle calculation part 78 are executed in the same manners as in the above-described first embodiment, descriptions with respect to the controls are omitted.

As shown in FIG. 15, the torque margin calculation part 140 has a multiplier 142. The multiplier 142 multiplies a steering angle velocity θd by a reciprocal number 1/Rgt of a target steering gear ratio Rgt which is calculated by the target relative angle calculation part 70 to thereby calculate a target relative angle velocity θd/Rgt of the steering ratio varying unit 16. The target relative angle velocity θd/Rgt is added to the steering angle velocity θd by an adder 143 to thereby calculate a rotation velocity θpd of the lower steering shaft 40. The rotation velocity θpd is input to a maximum allowable assist torque calculation part 144. The maximum allowable assist torque calculation part 144 calculates a maximum allowable assist torque Tamax of the power steering unit 14 from a map 146 on the basis of the rotation velocity θpd. It is to be noted that the map 146 is a stored information of the relationship between a rotation velocity θpd of the lower steering shaft 40 and a maximum allowable assist torque Tamax, and corresponds to FIG. 2.

As shown in FIG. 15, the maximum allowable assist torque Tamax is multiplied by a correction coefficient Kb by a multiplier 101 to thereby calculate a corrected maximum allowable assist torque Tamaxa. The multiplier 80 multiplies an assist electric current Ips by a torque constant Kps so as to calculate an actual assist torque Ta of the power steering unit 14. Further, the actual assist torque Ta is subtracted from the corrected maximum allowable assist torque Tamaxa by an adder 107 to thereby calculate a torque margin Mat indicating an increase allowance level of an assist torque of the power steering unit 14.

As shown in FIG. 16, the angle variation limiting value calculation part 148 which corresponds to the angle variation limiting value calculation part 76 in the first embodiment has a map 150 which stores a relationship between a torque margin Mat and an angle variation limiting value per unit time Δθplim of the lower steering shaft 40 relative to the upper steering shaft 38. The angle variation limiting value calculation part 148 calculates an angle variation limiting value Δθplim on the basis of a torque margin Mat so that the angle variation limiting value Δθplim increases as the torque margin Mat increases.

As is apparent from the above, according to the fourth embodiment, a maximum allowable assist torque Tamax of the power steering unit 14 is calculated on the basis of the rotation velocity θpd and the like and a deviation Tamax−Ta between the maximum allowable assist torque Tamax of the power steering unit 14 and the actual assist torque Ta of the power steering unit 14 is calculated as a torque margin Mat. An angle variation limiting value per unit time Δθplim of the lower steering shaft 40 is calculated so that the limiting value decreases as the torque margin Mat decreases and a target angle variation limiting value per unit time Δθpt is calculated which is based on the deviation between a target relative angle θpt of the lower steering shaft 40 and an actual relative angle θpa.

And as in the first to third embodiments, the target relative angle θpt is modified as necessary so that the target angle variation value Δθpt does not exceed in magnitude the angle variation limiting value Δθplim. The electric motor 46 of the steering ratio varying unit 16 is controlled so that an actual relative angle θpa of the lower steering shaft 40 conforms to a target angle variation value Δθpt.

Therefore, it is possible to positively prevent the target angle variation value Δθpt from exceeding in magnitude the angle variation limiting value Δθplim and to positively prevent the power steering unit 14 from being unable to generate a required assist torque due to the exceeding. Accordingly, a power assistance failure can positively be prevented from occurring even in the case where a steering operation is conducted over a large angular range at a low vehicle speed as in the case of a stationary steering.

Figure 27:
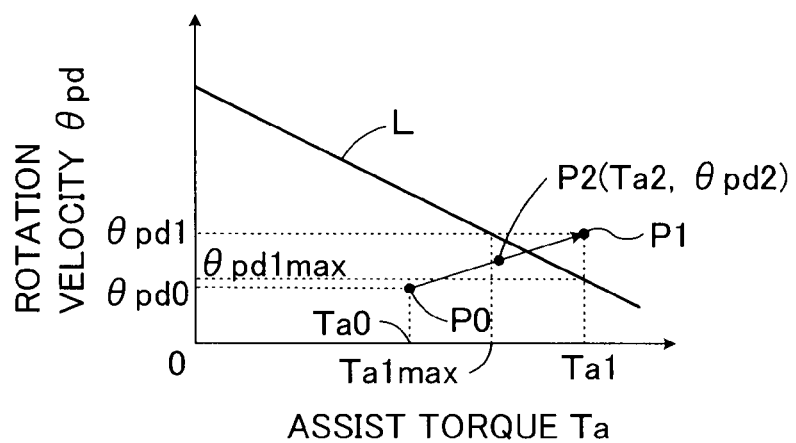
FIG. 27 is an explanatory view showing an example of changes of rotation velocity θpd and assist torque Ta in a conventional steering control device and the fourth embodiment with respect to the situation where a steering operation in which a steering reactive force becomes very high is conducted by a driver.

For example, a case is now considered in which a steering operation where a steering reactive force becomes very high is conducted by a driver as in the case of a stationary steering at a road surface having a high friction coefficient under the situation where the magnitude of a rotation velocity θpd of the lower steering shaft 40 and an assist torque Ta of the power steering unit 14 assume values (θpdo and Tao, respectively) of a point Po shown in FIG. 27.

It is now supposed that the magnitude of an assist torque Ta which the power steering unit 14 is required to generate rapidly increases to a value Ta1 above the line L indicating a maximum value and in connection with this change the magnitude of a rotation velocity θpd of the lower steering shaft 40 varies from θpd to θpd1. That is, a point indicating a rotation velocity θpd of the lower steering shaft 40 and an assist torque Ta of the power steering unit 14 is supposed to move to a position shown by a point P1 in FIG. 27. It is also supposed that under a situation where the magnitude of an assist torque Ta which the power steering unit 14 is required to generate is Ta1, a maximum value in magnitude of a rotation velocity θpd of the lower steering shaft 40 which allows the power steering unit 14 to generate the required assist torque assumes θpd1max.

In a conventional steering control device in which the control according to the fourth embodiment is not executed, the magnitude of an assist torque Ta which the power steering unit 14 is required to generate assumes a value larger than the maximum value Ta1max, resulting in that the power steering unit 14 can not generate a required assist torque Ta1 and a power assistance failure can occur.

By contrast, according to the fourth embodiment, as a steering operation in which a steering reactive force becomes very high is started by a driver and the magnitude of an assist torque Ta which the power steering unit 14 is required to generate increases, the torque margin Mat is decreased. Accordingly, an angle variation limiting value per unit time Δθplim of the lower steering shaft 40 relative to the upper steering shaft 38 is decreased and a target angle variation value per unit time Δθpt of the lower steering shaft 40 relative to the upper steering shaft 38 is limited in magnitude by the angle variation limiting value Δθplim. Therefore, the rotation velocity θpd of the lower steering shaft 40 is suppressed from increasing so that the rotation velocity θpd and the assist torque Ta which the power steering unit 14 is required to generate do not exceed in magnitude the line L indicating a possible maximum value.

By means of the suppression of the rotation velocity θpd as above, a point indicating a rotation velocity θpd of the lower steering shaft 40 and an assist torque Ta of the power steering unit 14 moves to a point P2 (Ta2, θpd2) which is on the side of the origin with respect to the line L in FIG. 27. Consequently, although an assist torque Ta of the power steering unit 14 becomes lower than a value Ta1 which the power steering unit 14 is required to generate, a power assistance failure can positively be prevented from occurring in the situation where a steering operation in which a steering reactive force becomes very high is conducted.

Fifth Embodiment

Figure 17:
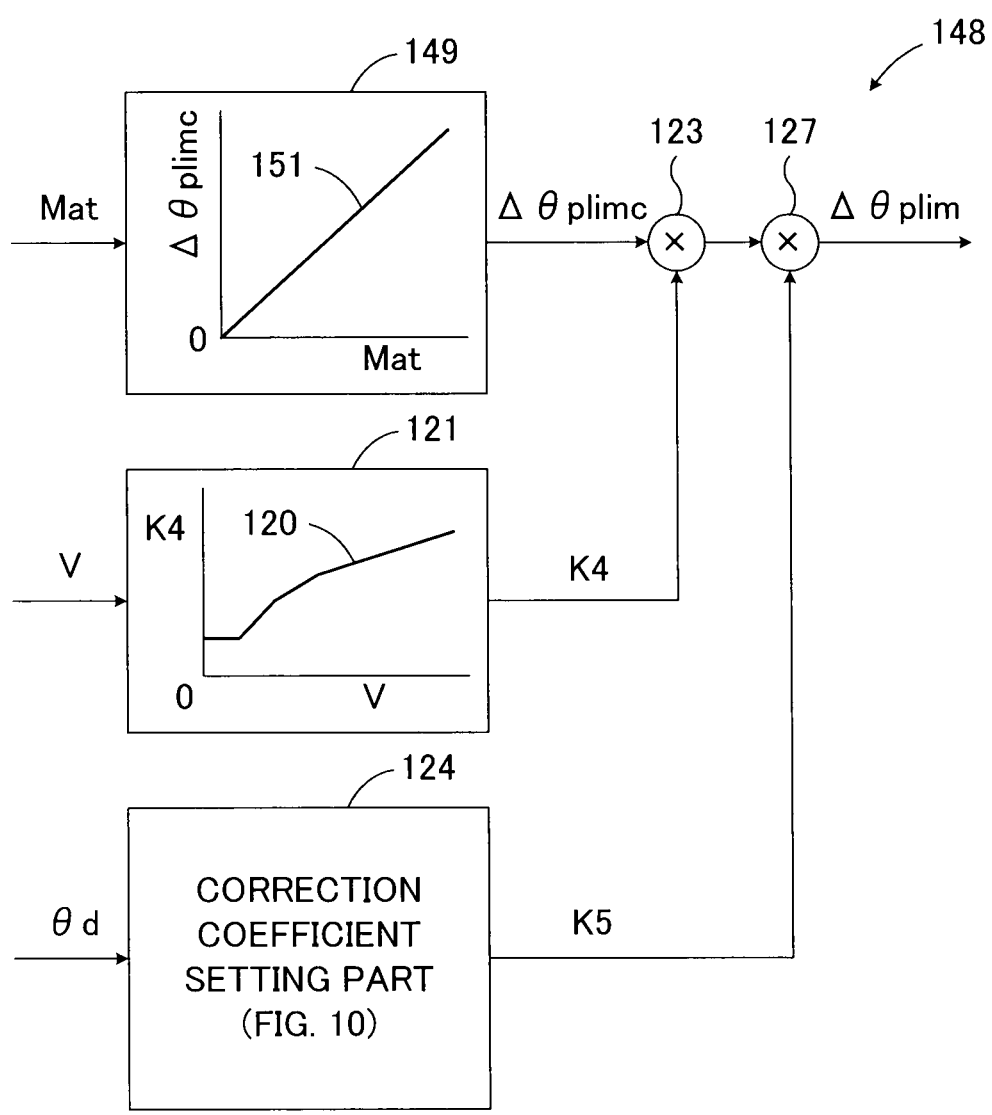
FIG. 17 is a functional block diagram showing the angle variation limiting value calculation part in a fifth embodiment of a vehicle steering control device according to the present invention which is configured as a modification of the fourth embodiment.

FIG. 17 is a functional block diagram showing the angle variation limiting value calculation part in a fifth embodiment of a vehicle steering control device according to the present invention which is configured as a modification of the fourth embodiment. It is to be noted that in this fifth embodiment, the controls other than the control of the functional block diagram shown in FIG. 17 are executed similarly to those in the above-described fourth embodiment.

In this fifth embodiment, as shown in FIG. 17, the angle variation limiting value calculation part 148 has a basic angle variation limiting value calculation block 149 having a map 151 corresponding to a map 150 in the fourth embodiment. The basic angle variation limiting value calculation block 149 calculates a basic angle variation limiting value Δθplimc from the map 151 on the basis of a torque margin Mat. The angle variation limiting value calculation part 148 also has a correction coefficient calculation block 121 which is same as that in the above-mentioned second embodiment. The correction coefficient calculation block 121 calculates a correction coefficient K4 from the map 120 on the basis of a vehicle speed V so that the coefficient is smaller when a vehicle speed V is low as compared with a case where a vehicle speed V is high. The correction coefficient K4 is multiplied by the basic angle variation limiting value Δθplimc by a multiplier 123.

Figure 10:
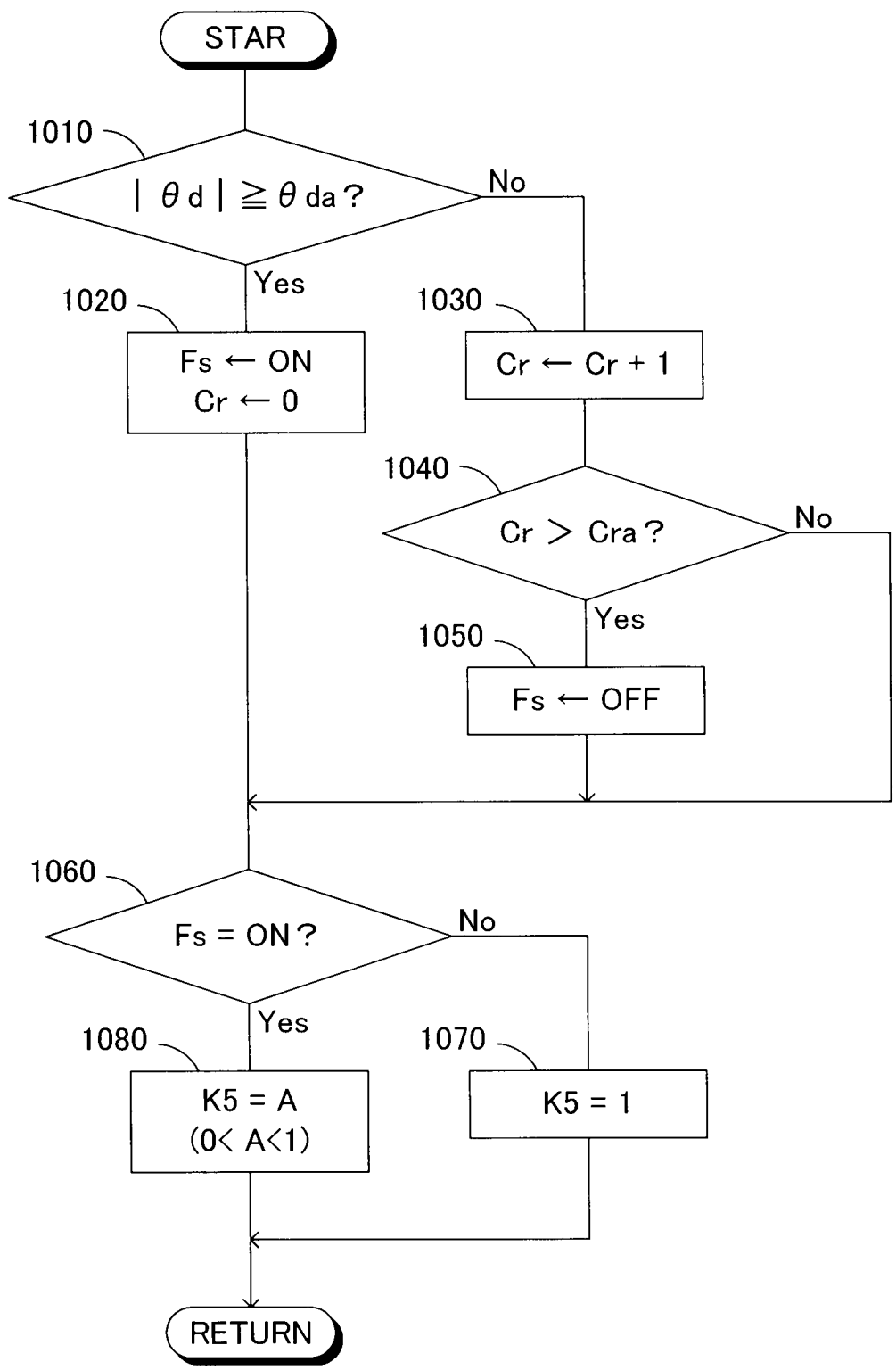
FIG. 10 is a flowchart showing the routine for setting the correction coefficient K5.

As in the above-mentioned second embodiment, the angle variation limiting value calculation part 148 sets a correction coefficient K5 according to the flowchart shown in FIG. 10 by the correction coefficient setting part 124 so that the coefficient is smaller when a steering operation is conducted quickly by a driver as compared with a case where a steering operation is conducted slowly by a driver. The correction coefficient K5 is multiplied by the output value K4·Δθplimc of the multiplier 123 by a multiplier 127 and the resultant value K4K5Δθplimc is fed to the final target relative angle calculation part 78 as a angle variation limiting value Δθplim.

Thus, according to the fifth embodiment, as in the above-described fourth embodiment, a power assistance failure can positively be prevented from occurring even in the case where a steering operation is conducted over a large angular range at a low vehicle speed as in the case of a stationary steering. And according to the fifth embodiment, as in the above-described second embodiment, it is possible to early determine a situation where an axial force of the rack bar 26 increases due to the lowering of a vehicle speed and to early reduce the angle variation limiting value Δθplim and it is also possible to early determine a situation where a rapid steering operation is conducted by a driver and to early reduce the angle variation limiting value Δθplim.

Sixth Embodiment

Figure 18:
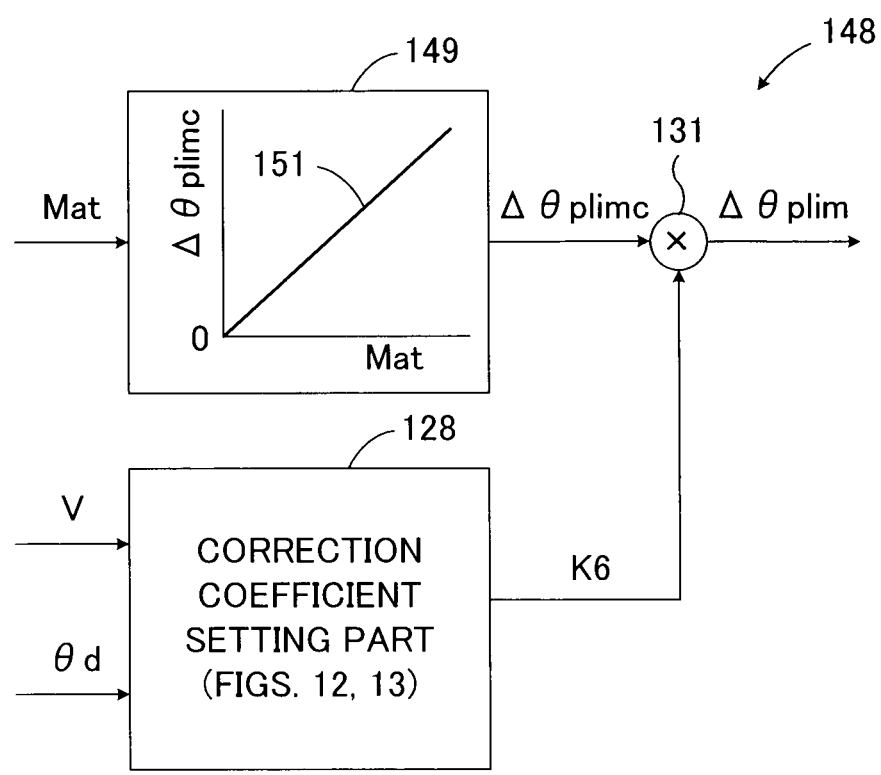
FIG. 18 is a functional block diagram showing the angle variation limiting value calculation part in a sixth embodiment of a vehicle steering control device according to the present invention which is configured as a modification of the fourth embodiment.

FIG. 18 is a functional block diagram showing the angle variation limiting value calculation part in a sixth embodiment of a vehicle steering control device according to the present invention which is configured as a modification of the fourth embodiment. It is to be noted that in this sixth embodiment, the controls other than the control of the functional block diagram shown in FIG. 18 are executed similarly to those in the above-described fourth embodiment.

In this sixth embodiment, the angle variation limiting value calculation part 148 has a basic angle variation limiting value calculation block 149 which is same as that in the fifth embodiment. The basic angle variation limiting value calculation block 149 calculates a basic angle variation limiting value Δθplimc from the map 151 on the basis of a torque margin Mat. The angle variation limiting value calculation part 148 also has a correction coefficient setting part 128 which is same as that in the above-mentioned third embodiment. The correction coefficient setting part 128 sets a correction coefficient K6 according to the flowcharts shown in FIGS. 12 and 13 so that the coefficient decreases when a steering operation is conducted over a large angular range by a driver at a low vehicle speed as in the case of a stationary steering or a rapid steering operation is conducted by a driver at a middle or high vehicle speed as in the case of an urgent steering for avoiding danger as compared with the case where those steerings are not conducted. The correction coefficient K6 is multiplied by the basic angle variation limiting value Δθplimc by a multiplier 131 and the resultant value K6·Δθplimc is fed to the final target relative angle calculation part 78 as an angle variation limiting value Δθplim.

Thus, according to the sixth embodiment, as in the above-described third embodiment, the correction coefficient K6 is variably set in accordance with a steering operation of a driver so that the coefficient is smaller when a steering operation is conducted over a large angular range by a driver at a low vehicle speed as in the case of a stationary steering or a rapid steering operation is conducted by a driver at a middle or high vehicle speed as in the case of an urgent steering for avoiding danger as compared with the case where those steerings are not conducted. And the angle variation limiting value Δθplim is modified by multiplying the angle variation limiting value Δθplim by the correction coefficient K6. Accordingly, a positive determination can be made as to situations where a steering operation is conducted over a large angular range by a driver at a low vehicle speed as in the case of a stationary steering or a rapid steering operation is conducted by a driver at a middle or high vehicle speed as in the case of an urgent steering for avoiding danger, and a power assistance failure can positively be prevented from occurring due to such steering operations.

Seventh Embodiment

Figure 19:
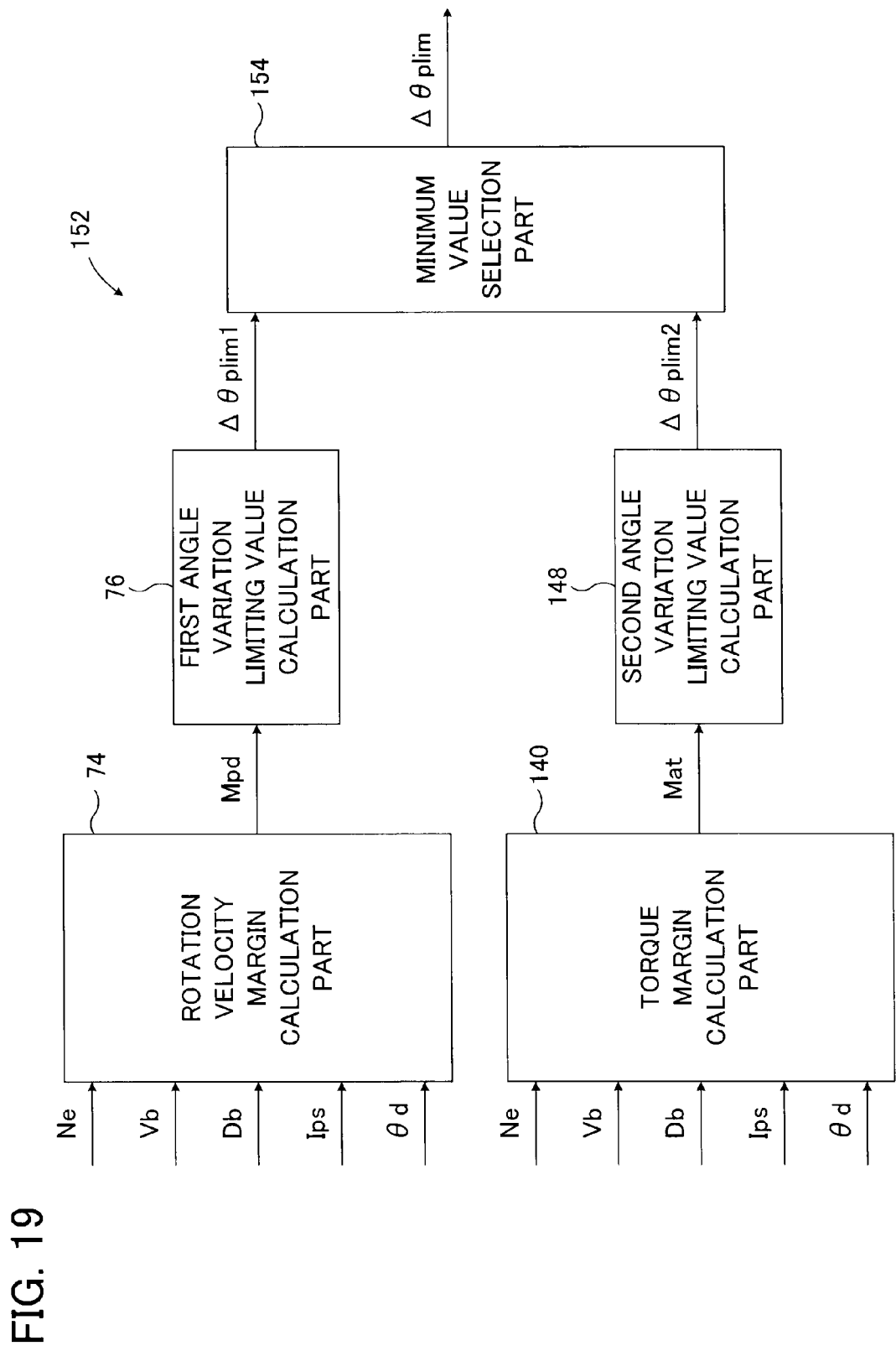
FIG. 19 is a functional block diagram of the steering ratio control unit in the steering control device according to the seventh embodiment.
Figure 20:
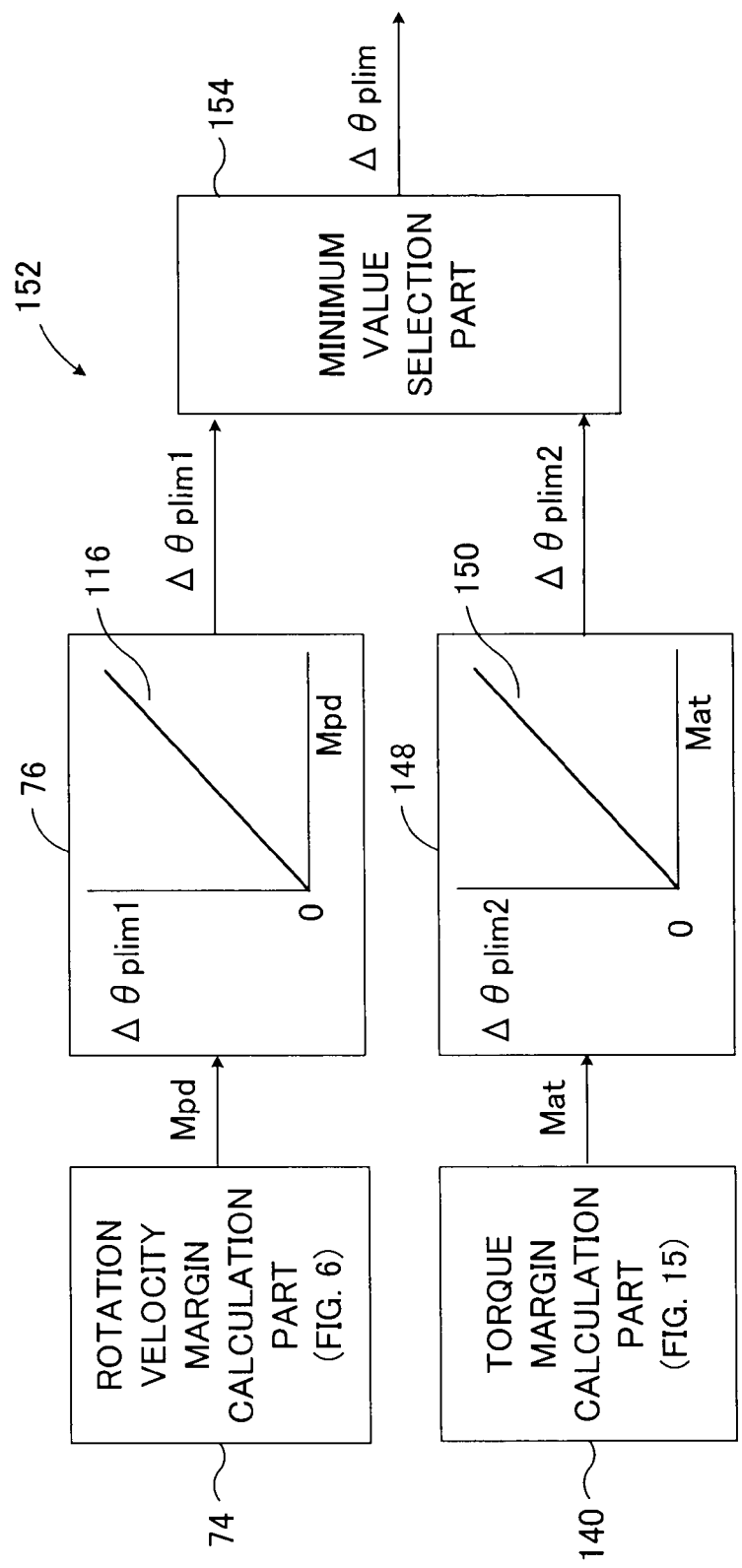
FIG. 20 is a functional block diagram showing in detail the angle variation limiting value calculation part shown in FIG. 19.

FIG. 19 is a functional block diagram of the steering ratio control unit 20 in the steering control device according to the seventh embodiment; FIG. 20 is a functional block diagram showing in detail the angle variation limiting value calculation part shown in FIG. 19. It is to be noted that the controls by the functional blocks shown in FIGS. 19 and 20 are started when an ignition switch not shown in the figures is turned on and is repeatedly executed at predetermined intervals.

As shown in FIG. 19, in this seventh embodiment, a rotation velocity margin Mpd is calculated by the rotation velocity margin calculation part 74 as in the above-described first to third embodiments and a torque margin Mat is calculated by the torque margin calculation part 140 as in the above-described fourth to sixth embodiments.

As shown in FIG. 19, an angle variation limiting value calculation part 152 in the embodiment has a first angle variation limiting value calculation part 76 which is the same as the angle variation limiting value calculation part 76 in the first embodiment, a second angle variation limiting value calculation part 148 which is the same as the angle variation limiting value calculation part 148 in the fourth embodiment, and a minimum value selection part 154.

The first angle variation limiting value calculation part 76 calculates a first angle variation limiting value Δθplim1 on the basis of the rotation velocity margin Mpd in the same manner as the angle variation limiting value calculation part 76 in the first embodiment. Similarly, the second angle variation limiting value calculation part 148 calculates a second angle variation limiting value Δθplim2 on the basis of a torque margin Mat in the same manner as the angle variation limiting value calculation part 148 in the fourth embodiment.

The first angle variation limiting value Δθplim1 and the second angle variation limiting value Δθplim2 are input to a minimum value selection part 154 and the minimum value selection part 154 selects the smaller one of the first angle variation limiting value Δθplim1 and the second angle variation limiting value Δθplim2 and outputs the selected value to the final target relative angle calculation part 78 as an angle variation limiting value Δθplim.

As shown in FIG. 20, the first angle variation limiting value calculation part 76 has a map 116 which stores the relationship between the rotation velocity margin Mpd and the first angle variation limiting value per unit time Δθplim1 of the lower steering shaft 40 relative to the upper steering shaft 38. The first angle variation limiting value calculation part 76 also calculates a first angle variation limiting value Δθplim1 on the basis of the rotation velocity margin Mpd so that the first angle variation limiting value Δθplim1 increases as the rotation velocity margin Mpd increases.

Similarly, the second angle variation limiting value calculation part 148 has a map 150 which stores the relationship between the torque margin Mat and the second angle variation limiting value per unit time Δθplim2 of the lower steering shaft 40 relative to the upper steering shaft 38. The second angle variation limiting value calculation part 148 also calculates a second angle variation limiting value Δθplim2 on the basis of the torque margin Mat so that the second angle variation limiting value Δθplim2 increases as the torque margin Mat increases.

Thus, according to the seventh embodiment, the first angle variation limiting value Δθplim1 is calculated on the basis of the rotation velocity margin Mpd in the same manner as in the first embodiment and the second angle variation limiting value Δθplim2 is calculated on the basis of the torque margin Mat in the same manner as in the fourth embodiment. The smaller one of the first angle variation limiting value Δθplim1 and the second angle variation limiting value Δθplim2 is set to the angle variation limiting value Δθplim.

Further, the target relative angle θpt is modified as necessary so that the target angle variation value Δθpt does not exceed in magnitude the angle variation limiting value Δθplim. The electric motor 46 of the steering ratio varying unit 16 is controlled so that an actual relative angle θpa of the lower steering shaft 40 conforms to a target angle variation value Δθpt.

Therefore, according to the seventh embodiment, as in the above-described first embodiment, a power assistance failure can positively be prevented from occurring even in the case where a rapid steering operation is conducted at a middle or high vehicle speed as in the case of an urgent steering for avoiding danger. Also as in the above-described fourth embodiment, a power assistance failure can positively be prevented from occurring even in the case where a steering operation is conducted over a large angular range at a low vehicle speed as in the case of a stationary steering.

Eighth Embodiment

Figure 21:
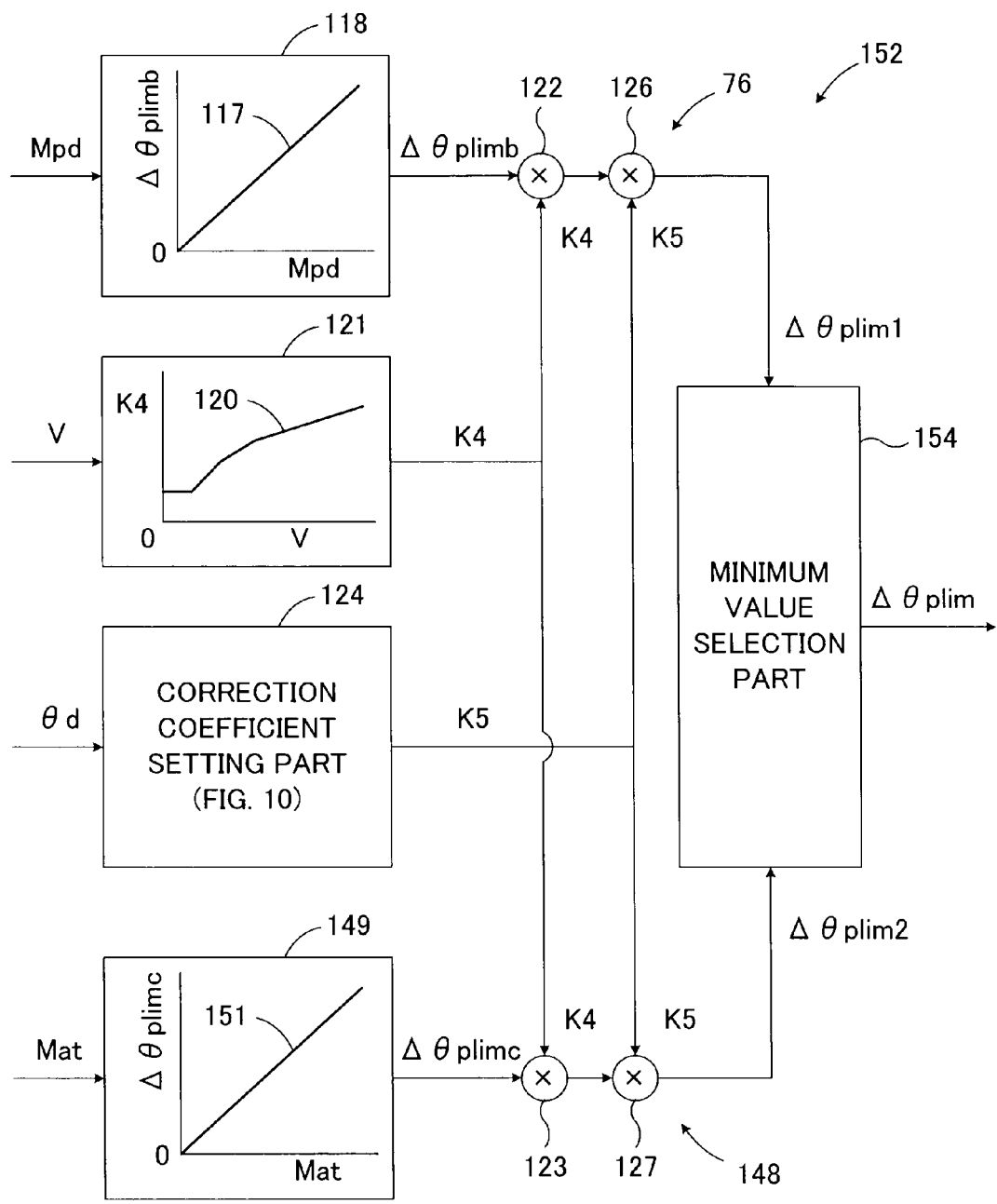
FIG. 21 is a functional block diagram of the angle variation limiting value calculation part in the eighth embodiment of the steering control device according to the present invention which is configured as a modification of the seventh embodiment.

FIG. 21 is a functional block diagram of the angle variation limiting value calculation part in the eighth embodiment of the steering control device according to the present invention which is configured as a modification of the seventh embodiment. It is to be noted that in this eighth embodiment, the controls other than the control of the functional block diagram shown in FIG. 21 are executed similarly to those in the above-described seventh embodiment.

As shown in FIG. 21, in this eighth embodiment, the first angle variation limiting value calculation part 76 calculates a first angle variation limiting value Δθplim1 on the basis of the rotation velocity margin Mpd in the same manner as the angle variation limiting value calculation part 76 in the second embodiment. The second angle variation limiting value calculation part 148 calculates a second angle variation limiting value Δθplim2 on the basis of a torque margin Mat in the same manner as the angle variation limiting value calculation part 148 in the fifth embodiment.

Therefore, according to the eighth embodiment, as in the above-described seventh embodiment, a power assistance failure can positively be prevented from occurring even in the case where a rapid steering operation is conducted at a middle or high vehicle speed as in the case of an urgent steering for avoiding danger or a steering operation is conducted over a large angular range at a low vehicle speed as in the case of a stationary steering.

According to the eighth embodiment, as in the above-described second and fifth embodiments, it is possible to early determine a situation where an axial force of the rack bar 26 increases due to the lowering of a vehicle speed and to early reduce the angle variation limiting value Δθplim and it is also possible to early determine a situation where a rapid steering operation is conducted by a driver and to early reduce the angle variation limiting value Δθplim.

Ninth Embodiment

Figure 22:
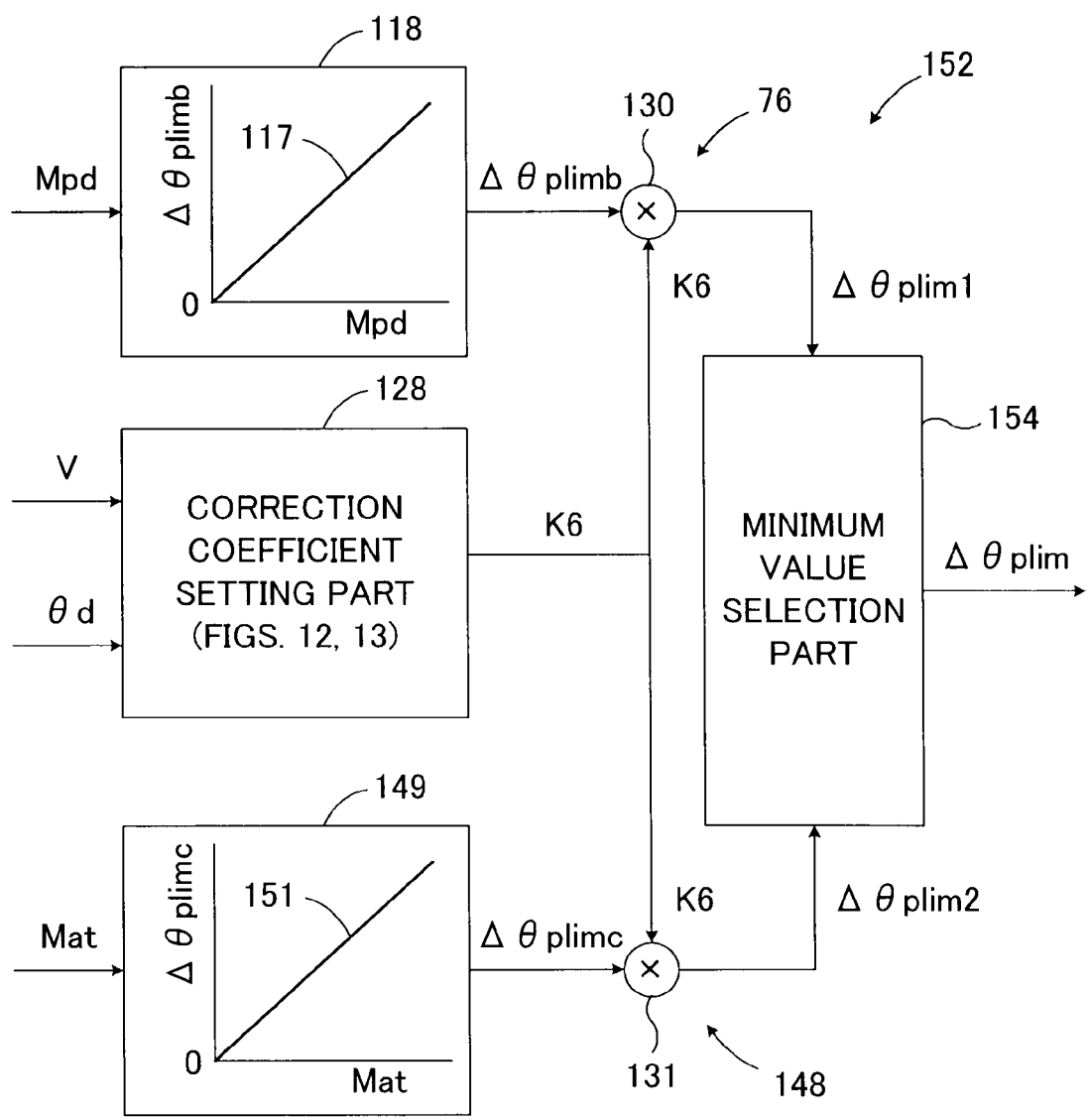
FIG. 22 is a functional block diagram of the angle variation limiting value calculation part in the ninth embodiment of the steering control device according to the present invention which is configured as a modification of the seventh embodiment.

FIG. 22 is a functional block diagram of the angle variation limiting value calculation part in the ninth embodiment of the steering control device according to the present invention which is configured as a modification of the seventh embodiment. It is to be noted that in this ninth embodiment, the controls other than the control of the functional block diagram shown in FIG. 22 are executed similarly to those in the above-described seventh embodiment.

As shown in FIG. 22, in this ninth embodiment, the first angle variation limiting value calculation part 76 calculates a first angle variation limiting value Δθplim1 on the basis of the rotation velocity margin Mpd in the same manner as the angle variation limiting value calculation part 76 in the third embodiment. The second angle variation limiting value calculation part 148 calculates a second angle variation limiting value Δθplim2 on the basis of a torque margin Mat in the same manner as the angle variation limiting value calculation part 148 in the sixth embodiment.

Therefore, according to the ninth embodiment, a positive determination can be made as to situations where a steering operation is conducted over a large angular range by a driver at a low vehicle speed as in the case of a stationary steering or a rapid steering operation is conducted by a driver at a middle or high vehicle speed as in the case of an urgent steering for avoiding danger, and a power assistance failure can more positively be prevented from occurring than in the above-described seventh embodiment even in the case where a rapid steering operation is conducted at a middle or high vehicle speed as in the case of an urgent steering for avoiding danger or a steering operation is conducted over a large angular range by a driver at a low vehicle speed as in the case of a stationary steering.

Tenth Embodiment

Figure 23:
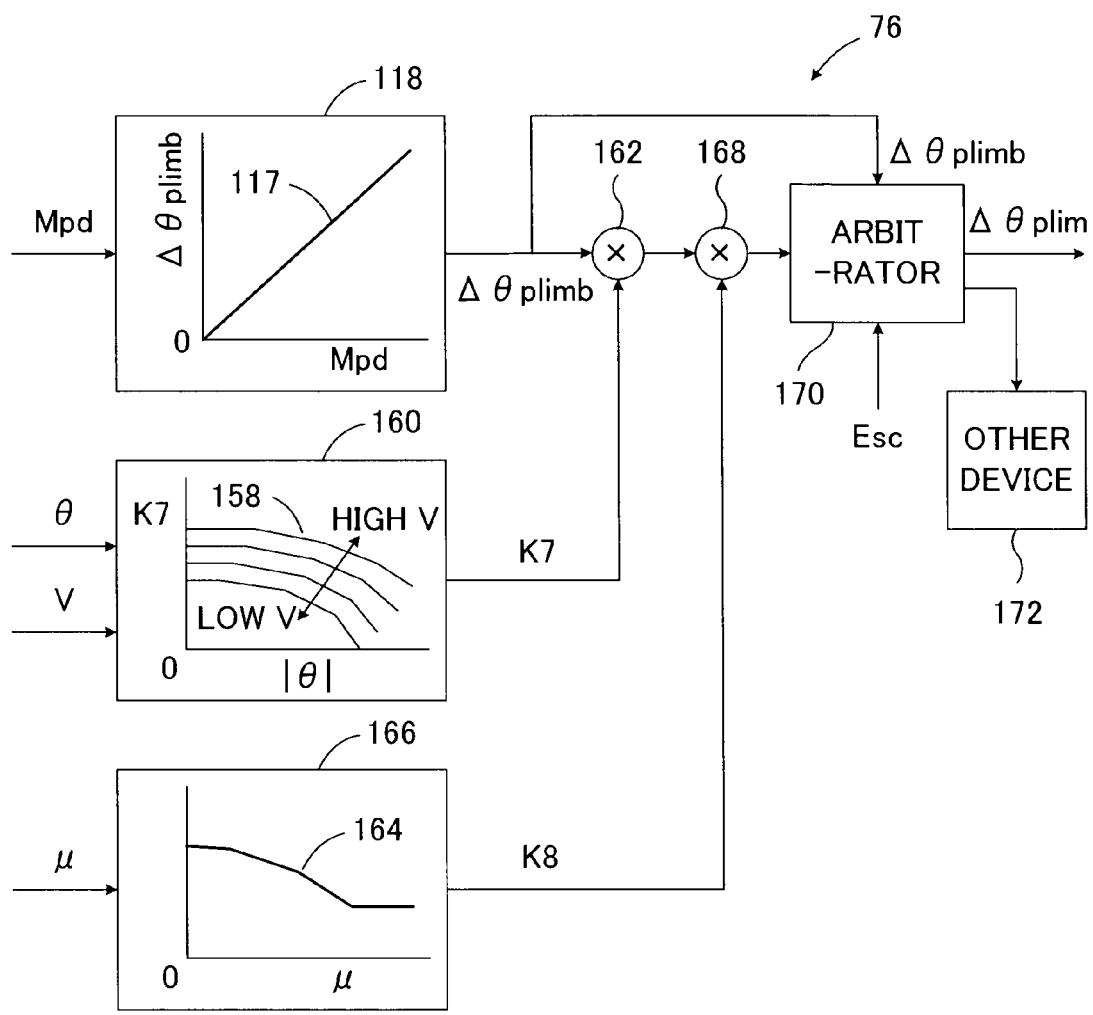
FIG. 23 is a functional block diagram of the angle variation limiting value calculation part in the tenth embodiment of the steering control device according to the present invention which is configured as a modification of the first embodiment.

FIG. 23 is a functional block diagram of the angle variation limiting value calculation part in the tenth embodiment of the steering control device according to the present invention which is configured as a modification of the first embodiment. It is to be noted that in this tenth embodiment, the controls other than the control of the functional block diagram shown in FIG. 23 are executed similarly to those in the above-described first embodiment.

In this tenth embodiment, the angle variation limiting value calculation part 76 has a basic angle variation limiting value calculation block 118 which is the same as that in the second embodiment and the basic angle variation limiting value calculation block 118 calculates a basic angle variation limiting value Δθplimb from the map 117 on the basis of the rotation velocity margin Mpd. The angle variation limiting value calculation part 76 has a correction coefficient calculation block 160 which contains a map 158 storing the relationship an absolute value of steering angle θ, a vehicle speed V and a correction coefficient K7. The correction coefficient calculation block 160 calculates a correction coefficient K7 to be a value that is not less than 0 and not more than 1 from the map 158 on the basis of an absolute value of steering angle θ and a vehicle speed V so that the coefficient is smaller when the absolute value of steering angle θ is large as compared the case where the absolute value of steering angle θ is small and the coefficient is smaller when the vehicle speed V is low as compared with the case where the vehicle speed V is high. The correction coefficient K7 is multiplied by the basic angle variation limiting value Δθplimb by a multiplier 162.

The angle variation limiting value calculation part 76 has a correction coefficient calculation block 166 which contains a map 164 storing the relationship a friction coefficient μ of a road surface and a correction coefficient K8. The correction coefficient calculation block 166 calculates a correction coefficient K8 to be a value that is not less than 0 and not more than 1 from the map 164 on the basis of a friction coefficient μ of a road surface so that the coefficient K8 is larger when the friction coefficient μ of a road surface is low as compared the case where the friction coefficient μ of a road surface is high. The correction coefficient K8 is multiplied by the calculated value K7·Δθplimb fed from the multiplier 162 by a multiplier 168 and the resultant value of K7·K8·Δθplimb is fed to an arbitrator 170.

It is to be noted that since the manner to determine a friction coefficient μ of a road surface does not constitute a part of the present invention, a friction coefficient μ of a road surface may be a value detected or estimated by any method adopted in general in the fields such as anti-skid control, traction control, dynamic control of a vehicle or the like.

A vehicle to which the tenth embodiment is adapted is equipped with a pre-crash safety system. If an obstacle is detected in front of the vehicle, the pre-crash safety system controls the vehicle speed and alters an advancing direction of the vehicle by driving the left and right front wheels 22FL and 22FR to steer by means of the steering ratio varying unit 16, to thereby reduce the possibility of collision against the obstacle.

The arbitrator 170 is fed with a signal representative of an emergency degree Esc of altering an advancing direction of the vehicle by the operation of the steering ratio varying unit 16 in response to high possibility of collision against an obstacle. When the emergency degree Esc of altering an advancing direction of the vehicle is not higher than a reference value Esc0 as in a normal running situation where no obstacle is detected in front of the vehicle, the arbitrator 170 feeds the resultant value of K7·K8·Δθplimb input from the multiplier 168 to the final target relative angle calculation part 78 as the angle variation limiting value Δθplim. To the contrary, when the emergency degree Esc of altering an advancing direction of the vehicle is higher than the reference value Esc0, the arbitrator 170 feeds the basic angle variation limiting value Δθplimb input from the basic angle variation limiting value calculation block 118 to the final target relative angle calculation part 78 as the angle variation limiting value Δθplim.

When the arbitrator 170 feeds the basic angle variation limiting value Δθplimb to the final target relative angle calculation part 78, it outputs a command signal for reducing the electric power consumption to each of other devices 172 such as an audio unit which operate using the electric power fed from the power source 60 to reduce the output or for temporary stopping the operation of the device.

Thus, according to the tenth embodiment, as in the above-described first embodiment, a power assistance failure can positively be prevented from occurring even in the case where a rapid steering operation is conducted at a middle or high vehicle speed as in the case of an urgent steering for avoiding danger. Also a power assistance failure can positively be prevented from occurring in the case where a steering torque becomes high due to the following reason.

In general, as the absolute value of steering angle θ increases and vehicle speed V lowers, the axial force of the rack bar 26 of the electric power steering unit 14 increases due to a self-aligning torque of the left and right front wheels 22FL and 22FR and the steering torque becomes higher accordingly. As a result, an assist torque which the electric power steering unit 14 is required to generate becomes higher and the electric power which the electric power steering unit 14 requires becomes higher. Therefore, as the absolute value of steering angle θ increases and a vehicle speed V lowers, the possibility of a power assistance failure increases.

According to the tenth embodiment, as the absolute value of steering angle θ increases and a vehicle speed V lowers, the correction coefficient K7 is calculated to be smaller and the angle variation limiting value Δθplim is calculated to be smaller. Therefore, as the electric power required by the electric power steering unit 14 becomes higher, the target angle variation value Δθpt decreases in magnitude, which decreases the relative rotational velocity of the lower steering shaft 40 by the steering ratio varying unit 16 and lowers the steering drive velocity of the left and right front wheels. Therefore, an assist torque which the electric power steering unit 14 generates can be increased, which enables to effectively prevent a power assistance failure from occurring under the situation where a steering torque becomes high.

In general, the axial force of the rack bar 26 of the electric power steering unit 14 when the left and right front wheels 22FL and 22FR are steered varies in connection with the friction coefficient μ of a road surface. As the friction coefficient μ of a road surface lowers, the axial force of the rack bar 26 decreases and the steering torque decreases accordingly.

According to the tenth embodiment, as the friction coefficient μ of a road surface lowers, the correction coefficient K8 is calculated to be larger and the angle variation limiting value Δθplim is calculated to be larger. Therefore, it is possible to effectively prevent the relative rotational velocity of the lower steering shaft 40 by the steering ratio varying unit 16 from being unnecessarily lowered and it is possible to effectively prevent the steering drive velocity of the left and right front wheels from being unnecessarily lowered under the situation where the friction coefficient μ of a road surface is low while positively preventing a power assistance failure from occurring in the case where a steering torque becomes high under the situation where the friction coefficient μ of a road surface is high. It is to be noted that the same operations and working-effects can be attained in the under-described eleventh and twelfth embodiments.

According to the tenth embodiment, when the emergency degree Esc of altering an advancing direction of the vehicle by the operation of the steering ratio varying unit 16 is higher than a reference value Esc0, the basic angle variation limiting value Δθplimb calculated by the basic angle variation limiting value calculation block 118 is set to the angle variation limiting value Δθplim and a command signal for reducing electric power consumption is output to each of other devices which utilize the electric power supplied by the power source 60.

Therefore, the steering drive velocity of the left and right front wheels can be prevented from being restricted to a low velocity under the situation where the necessity is high for altering the advancing direction of the vehicle by the operation of the steering ratio varying unit 16, which enables to effectively alter the advancing direction of the vehicle by the operation of the steering ratio varying unit 16. By ensuring the situation where the electric power steering unit 14 is supplied with the electric power as much as possible from the power source 60, a power assistance failure can be prevented from occurring as effectively as possible. It is to be noted that the same operations and working-effects can be attained in the under-described eleventh and twelfth embodiments.

Eleventh Embodiment

Figure 24:
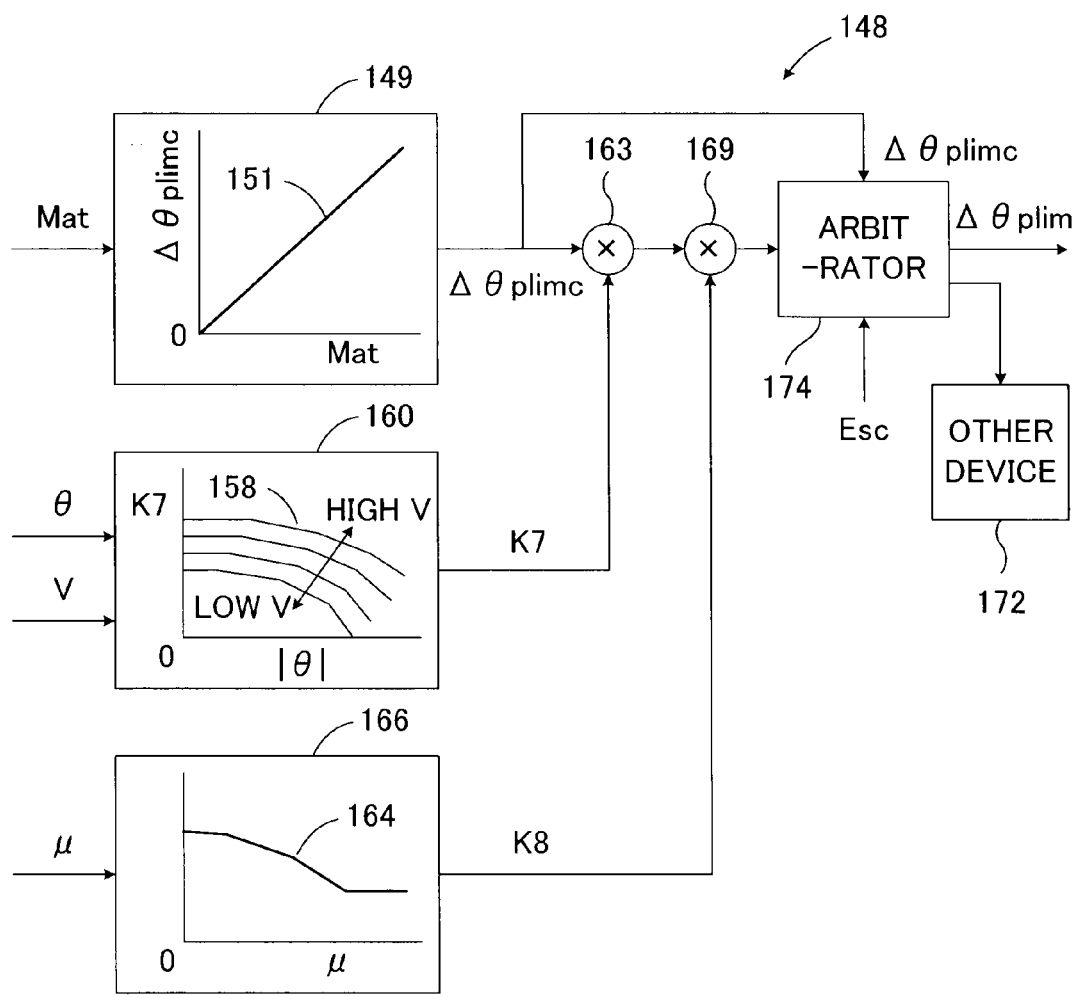
FIG. 24 is a functional block diagram of the angle variation limiting value calculation part in the eleventh embodiment of the steering control device according to the present invention which is configured as a modification of the fourth embodiment.

FIG. 24 is a functional block diagram of the angle variation limiting value calculation part in the eleventh embodiment of the steering control device according to the present invention which is configured as a modification of the fourth embodiment. It is to be noted that in this eleventh embodiment, the controls other than the control of the functional block diagram shown in FIG. 24 are executed similarly to those in the above-described fourth embodiment.

In this eleventh embodiment, the angle variation limiting value calculation part 148 has a basic angle variation limiting value calculation block 149 which is the same as that in the fifth embodiment. The angle variation limiting value calculation part 148 has correction coefficient calculation blocks 160 and 166 which are the same as those in the tenth embodiment. The correction coefficient K7 calculated by the correction coefficient calculation blocks 160 is multiplied by the basic angle variation limiting value Δθplimc by a multiplier 163. The correction coefficient K8 calculated by the correction coefficient calculation blocks 166 is multiplied by a multiplier 169 by the value K7·Δθplimc calculated by a multiplier 163 and the resultant value K7·K8·Δθplimc is fed to an arbitrator 174. The arbitrator 174 operates in the same manner as the arbitrator 170 in the tenth embodiment.

Therefore, according to the eleventh embodiment, as in the above-described fourth embodiment, a power assistance failure can positively be prevented from occurring even in the case where a steering operation is conducted over a large angular range at a low vehicle speed as in the case of a stationary steering. And according to the eleventh embodiment, as in the above-described second embodiment, it is possible to early determine a situation where an axial force of the rack bar 26 increases due to the lowering of a vehicle speed and to early reduce the angle variation limiting value Δθplim and it is also possible to early determine a situation where a rapid steering operation is conducted by a driver and to early reduce the angle variation limiting value Δθplim.

Further, according to the eleventh embodiment, as in the above-described tenth embodiment, a power assistance failure can positively be prevented from occurring under the situation where the steering torque is high when an automatic steering is conducted by the pre-crash safety system and an assist torque which the power steering unit 14 is required to generate is high.

Twelfth Embodiment

Figure 25:
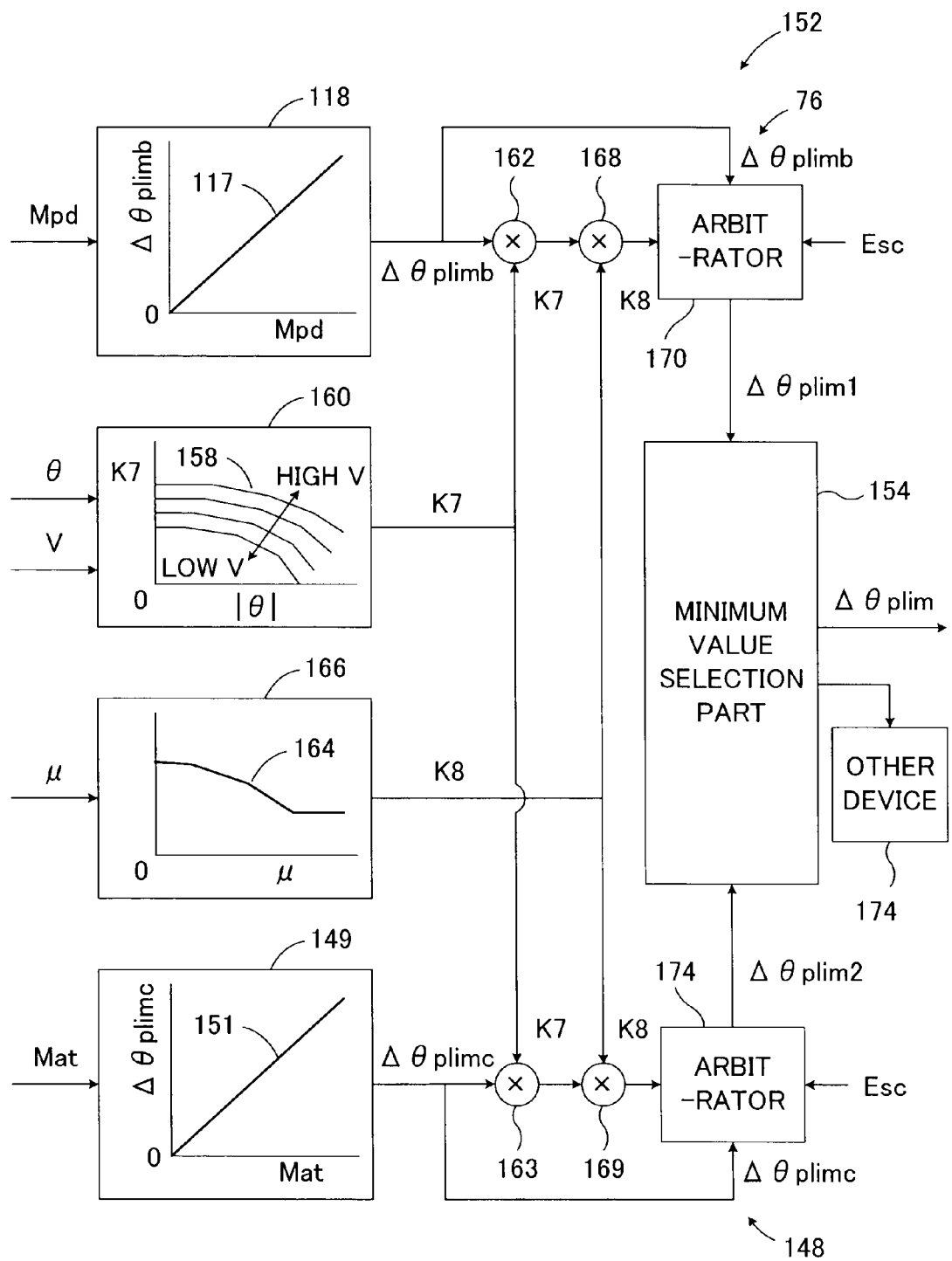
FIG. 25 is a functional block diagram of the angle variation limiting value calculation part in the twelfth embodiment of the steering control device according to the present invention which is configured as a modification of the seventh embodiment.

FIG. 25 is a functional block diagram of the angle variation limiting value calculation part in the twelfth embodiment of the steering control device according to the present invention which is configured as a modification of the seventh embodiment. It is to be noted that in this twelfth embodiment, the controls other than the control of the functional block diagram shown in FIG. 25 are executed similarly to those in the above-described seventh embodiment.

In this twelfth embodiment, as shown in FIG. 25, the first angle variation limiting value calculation part 76 has the basic angle variation limiting value calculation block 118, the multipliers 162 and 168 and the arbitrator 170 which are the same as those the angle variation limiting value calculation part 76 in the tenth embodiment has. The second angle variation limiting value calculation part 148 has the basic angle variation limiting value calculation block 149, the multipliers 163 and 169 and the arbitrator 174 which are the same as those the angle variation limiting value calculation part 148 in the eleventh embodiment has. The first angle variation limiting value calculation part 76 and the second angle variation limiting value calculation part 148 have the correction coefficient calculation block 160 and 166 as common calculation blocks.

The arbitrator 170 in this embodiment arbitrates the basic angle variation limiting value Δθplimb and the value of K7·K8·Δθplimb and feeds the arbitrated value to the minimum value selection part 154 as a first angle variation limiting value Δθplim1. The arbitrator 174 arbitrates the basic angle variation limiting value Δθplimc and the value of K7·K8·Δθplimc and feeds the arbitrated value to the minimum value selection part 154 as a second angle variation limiting value Δθplim2. However the arbitrators 170 and 174 do not output any command signal for reducing the electric power consumption.

In this twelfth embodiment, the minimum value selection part 154 selects the smaller one of the first angle variation limiting value Δθplim1 and the second angle variation limiting value Δθplim2 and outputs the selected value to the final target relative angle calculation part 78 as an angle variation limiting value Δθplim. The minimum value selection part 154 outputs as necessary a command signal for reducing the electric power consumption to each of other devices 172 which operate using the electric power fed from the power source 60.

That is, the minimum value selection part 154 outputs a command signal for reducing the electric power consumption when the first angle variation limiting value Δθplim1 is the basic angle variation limiting value Δθplimb and is smaller than the second angle variation limiting value Δθplim2, in other words, when the basic angle variation limiting value Δθplimb is set to the angle variation limiting value Δθplim. Alternatively, the minimum value selection part 154 outputs a command signal for reducing the electric power consumption when the second angle variation limiting value Δθplim2 is the basic angle variation limiting value Δθplimc and is smaller than the first angle variation limiting value Δθplim1, in other words, when the basic angle variation limiting value Δθplimc is set to the angle variation limiting value Δθplim.

Therefore, according to the twelfth embodiment, as in the above-described first embodiment, a power assistance failure can positively be prevented from occurring even in the case where a rapid steering operation is conducted at a middle or high vehicle speed as in the case of an urgent steering for avoiding danger. Also as in the above-described fourth embodiment, a power assistance failure can positively be prevented from occurring even in the case where a steering operation is conducted over a large angular range at a low vehicle speed as in the case of a stationary steering. Further, as in the above-described tenth embodiment, a power assistance failure can positively be prevented from occurring under the situation where the steering torque is high when an automatic steering is conducted by the pre-crash safety system and an assist torque which the power steering unit 14 is required to generate is high.

As is apparent from the above, according to the first through twelfth embodiments, the angle variation limiting value per unit time $\Delta\theta$plim of the lower steering shaft 40 is calculated so that it becomes smaller as the rotation velocity margin Mpd or the torque margin Mat decreases and the target relative rotation angle $\theta$pt is modified as necessary so that the target angle variation value $\Delta\theta$pt does not exceed in magnitude the angle variation limiting value $\Delta\theta$plim.

Therefore, under the situation where there is no fear of a power assistance failure, the target relative rotation angle $\theta$pt can be prevented from being unnecessarily modified and the steering ratio control can be performed as properly as possible. Under the situation where there is a fear of a power assistance failure, the rotation velocity of the lower steering shaft 40 can positively be decreased in magnitude as compared with the case where the target relative rotation angle $\theta$pt is not modified and the power steering unit 14 can positively be prevented from being unable to generate required assist torque due to high velocity of steering drive velocity of the left and right front wheels.

According to the above-described embodiments, since a power assistance failure can be prevented from occurring even in the case where the power steering unit 14 is not of large-sized and high power type, it is not necessary to adopt the power steering unit of large-sized and high power type, which enables to made smaller and cheaper the steering control device having the power steering unit and the steering ratio control unit.

According to the above-described embodiments, the power source 60 is common to both the power steering unit 14 and the steering ratio control unit 16 and these units operate utilizing the electric power supplied by the power source. Under the situation where rapid steering operation is conducted at a middle or high vehicle speed as in the case of an urgent steering for avoiding danger or a steering operation is conducted over a large angular range at a low vehicle speed as in the case of a stationary steering, the control quantity of the steering ratio control unit 16 is reduced and the consumed electric power is thereby reduced. Therefore, the possibility can positively be reduced that the power steering unit 14 and/or the steering ratio control unit 16 can not operate properly due to the lowering of the electric power supplied by the power source 60.

While the present invention has been described in detail with reference to the above particular embodiments, it will be apparent to those skilled in the art that the present invention is not limited thereto, but may be embodied in various other forms without departing from the scope of the invention.

Figure 28:
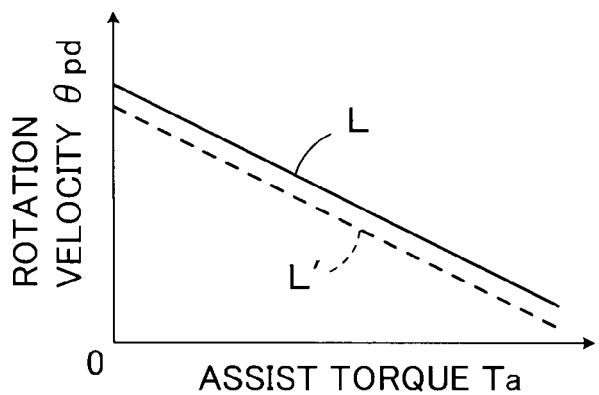
FIG. 28 is a graph showing the relationship between an assist torque Ta and a rotation velocity θpd.

For example, in the above-described embodiments, the maximum allowable rotation velocity $\theta$pdmax of the lower steering shaft 40 is calculated from the map 84 which corresponds to FIG. 2 on the basis of an assist torque Ta and the maximum allowable assist torque Tamax of the power steering unit 14 is calculated from a map 146 which corresponds to FIG. 2 on the basis of the rotation velocity $\theta$pd. However, the maximum allowable rotation velocity $\theta$pdmax and the maximum allowable assist torque Tamax may be calculated to values which have more allowance than the actual maximum allowable rotation velocity and the actual maximum allowable assist torque as shown in FIG. 28 by a broken line L' which is located on the side of the origin than the line showing the maximum value.

Figure 29:
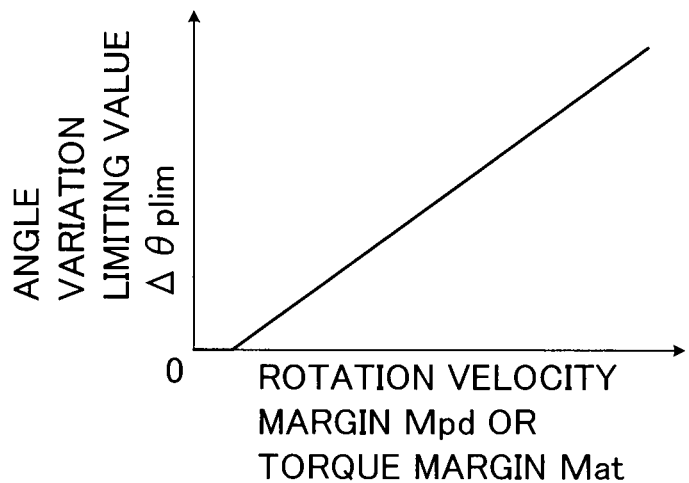
FIG. 29 is a graph showing the relationship between a rotation velocity margin Mpd or a torque margin Mat and an angle variation limiting value Δθplim.

Similarly, the angle variation limiting values $\Delta\theta$plim, $\Delta\theta$plimb and $\Delta\theta$plimc are calculated from maps 116 and the like on the basis of the rotation velocity margin Mpd or the torque margin Mat so that as the rotation velocity margin Mpd or the torque margin Mat increases, the angle variation limiting values $\Delta\theta$plim and the like increase. However, these maps may be replaced by the maps shown in FIG. 29 and the angle variation limiting values $\Delta\theta$plim and the like may be calculated to be zero when the rotation velocity margin Mpd or the torque margin Mat is small.

In the above-described embodiments, the correction coefficients K1-K3 for the electric power supplying capacity of the power source 60 are calculated by the correction coefficient calculation parts 86-90. The correction coefficients Kb which is the multiplied value of the correction coefficients K1-K3 is multiplied by the maximum allowable rotation velocity $\theta$pdmax to calculate the corrected maximum allowable rotation velocity $\theta$pdmaxa. The correction coefficients Kb is also multiplied by the maximum allowable assist torque Tamax to calculate the corrected maximum allowable assist torque Tamaxa.

Figure 30:
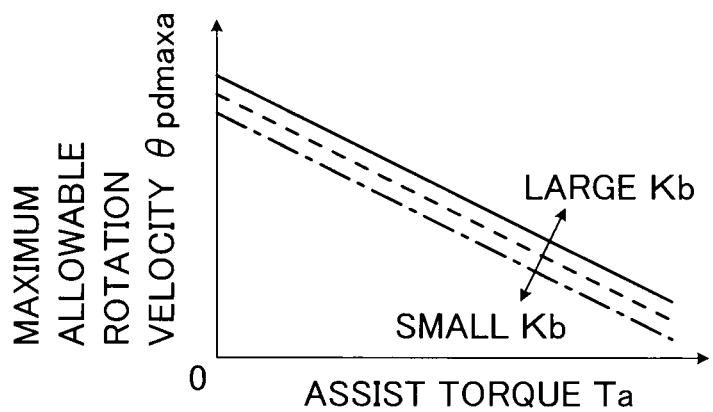
FIG. 30 is a graph showing the relationship among an assist torque Ta, a maximum allowable rotation velocity θpdmaxa, and a correction coefficient Kb.
Figure 31:
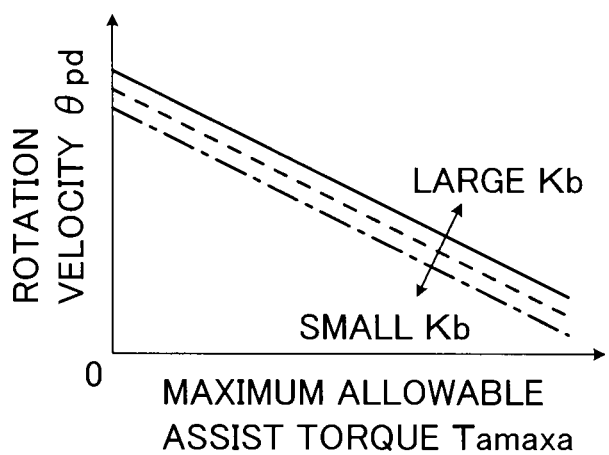
FIG. 31 is a graph showing the relationship among a maximum allowable assist torque Tamaxa, a rotation velocity θpd, and a correction coefficient Kb.

However, the map 84 may be modified according to the correction coefficients Kb so that as shown in FIG. 30, the maximum allowable rotation velocity $\theta$pdmaxa becomes smaller as the correction coefficients Kb decreases. Similarly, the map 146 may be modified according to the correction coefficients Kb so that as shown in FIG. 31, the maximum allowable assist torque Tamaxa becomes smaller as the correction coefficients Kb decreases. Alternatively, the rotation velocity margin Mpd or the torque margin Mat may be corrected with the correction coefficients Kb.

In the above-described embodiments, the correction coefficients K4-K6 are multiplied by the basic angle variation limiting value $\Delta\theta$plimb or $\Delta\theta$plimc. However, these correction coefficients may be multiplied by the rotation velocity margin Mpd or the torque margin Mat and the angle variation limiting values $\Delta\theta$plim may be calculated on the basis of the corrected rotation velocity margin Mpd or the corrected torque margin Mat.

In the above-described embodiments, the power source 60 is common to both the power steering unit 14 and the steering ratio control unit 16 and these units operate utilizing the electric power supplied by the power source. However, the present invention may be adapted to a vehicle in which the power steering unit and the steering ratio control unit are supplied with the electric power by the associated power sources.

In the above-described embodiments, the assist torque Ta is calculated by multiplying an assist electric current Ips by the torque constant Kps. However, the assist torque Ta may be calculated in any manner known in the art.

In the above-described fourth to ninth, eleventh and twelfth embodiments, the rotation velocity $\theta$pd of the lower steering shaft 40 is calculated as the sum of the steering angle velocity $\theta$d and the product of the steering angle velocity $\theta$d and the reciprocal number 1/Rgt of the target steering gear ratio Rgt. However, the rotation velocity $\theta$pd may be calculated in any manner known in the art. Alternatively, the rotation velocity $\theta$pd may be estimated on the basis of the rotation velocity of the electric motor 32 of the power steering unit 14 or may be a detected value in the case where the lower steering shaft 40 is provided with a rotation speed sensor.

The configuration of the tenth embodiment may be adapted to the second embodiment. That is, the value K4·K5·$\Delta\theta$plimb calculated by the multiplier 126 may be multiplied by the correction coefficients K7 and K8 by the multiplier 162 and 168, respectively and the arbitrator 170 may arbitrate the basic angle variation limiting value $\Delta\theta$plimb and the value K4·K5·K7·K8$\Delta\theta$plimb.

Similarly, the configuration of the tenth embodiment may be adapted to the third embodiment. That is, the value K6·$\Delta\theta$plimb calculated by the multiplier 130 may be multiplied by the correction coefficients K7 and K8 by the multiplier 162 and 168, respectively and the arbitrator 170 may arbitrate the basic angle variation limiting value Δθplimb and the value K6·K7·K8 Δθplimb.

Alternatively, the configuration of the eleventh embodiment may be adapted to the fourth embodiment. That is, the value K4·K5·Δθplimc calculated by the multiplier 127 may be multiplied by the correction coefficients K7 and K8 by the multiplier 163 and 169, respectively and the arbitrator 174 may arbitrate the basic angle variation limiting value Δθplimc and the value K4·K5·K7·K8 Δθplimc.

Similarly, the configuration of the eleventh embodiment may be adapted to the fifth embodiment. That is, the value K6·Δθplimc calculated by the multiplier 131 may be multiplied by the correction coefficients K7 and K8 by the multiplier 163 and 169, respectively and the arbitrator 174 may arbitrate the basic angle variation limiting value Δθplimc and the value K6·K7·K8 Δθplimc.

Alternatively, the configuration of the twelfth embodiment may be adapted to the eighth embodiment. That is, the value K4·K5·Δθplimb calculated by the multiplier 126 may be multiplied by the correction coefficients K7 and K8 by the multiplier 162 and 168, respectively and the arbitrator 170 may arbitrate the basic angle variation limiting value Δθplimb and the value K4·K5·K7·K8Δθplimb. The value K4·K5·Δθplimc calculated by the multiplier 127 may be multiplied by the correction coefficients K7 and K8 by the multiplier 163 and 169, respectively and the arbitrator 174 may arbitrate the basic angle variation limiting value Δθplimc and the value K4·K5·K7·K8 Δθplimc.

Similarly, the configuration of the twelfth embodiment may be adapted to the ninth embodiment. That is, the value K6·Δθplimb calculated by the multiplier 130 may be multiplied by the correction coefficients K7 and K8 by the multiplier 162 and 168, respectively and the arbitrator 170 may arbitrate the basic angle variation limiting value Δθplimb and the value K6·K7·K8 Δθplimb. The value K6·Δθplimc calculated by the multiplier 131 may be multiplied by the correction coefficients K7 and K8 by the multiplier 163 and 169, respectively and the arbitrator 174 may arbitrate the basic angle variation limiting value Δθplimc and the value K6·K7·K8 Δθplimc.

The invention claimed is:

1. A vehicle steering control device comprising:
an electric power steering unit which generates steering assisting power for driving steerable wheels to steer;
a steering ratio varying unit which drives an output member relative to an input member, which is driven by a steering operation of a driver, to vary a steering ratio that is a ratio of a steering angle variation value of the steerable wheels with respect to a steering operation quantity of the driver; and
a control unit which controls said steering ratio varying unit,
wherein said steering ratio varying unit is disposed on a side of said input member with respect to said power steering unit as viewed with respect to a transmitting path of the steering operation of the driver,
wherein said control unit decreases in magnitude a relative drive velocity of said output member driven by said steering ratio varying unit relative to said input member when a magnitude of a difference between a maximum value of a steering drive velocity range of said steerable wheels which allows said power steering unit to generate a required steering assisting power and an actual steering drive velocity of said steerable wheels is small as compared to where the magnitude of said steering drive velocity difference is large.

2. A vehicle steering control device according to claim 1, wherein said control unit sets a limiting value for the relative drive velocity of said output member so that the limiting value decreases when said steering drive velocity difference is small in magnitude as compared to where said steering drive velocity difference is large in magnitude, and
wherein the control unit limits the relative drive velocity in magnitude to said limiting value when the relative drive velocity caused by said steering ratio varying unit is larger than said limiting value in magnitude but does not limit the relative drive velocity in magnitude when the relative drive velocity caused by said steering ratio varying unit is not larger than said limiting value in magnitude.

3. The vehicle steering control device according to claim 1, wherein said control unit decreases the magnitude of the relative drive velocity caused by said steering ratio varying unit when a difference between a maximum value of a steering assisting power range which said power steering unit can generate when said steerable wheels are driven to steer at a required steering drive velocity and an actual steering assisting power of said power steering unit is small in magnitude as compared to where said steering assisting power difference is large in magnitude.

4. The vehicle steering control device according to claim 3, wherein said control unit sets a limiting value for said relative drive velocity of said output member so that the limiting value decreases when said steering assisting power difference is small in magnitude as compared to where said steering assisting power difference is large in magnitude, and
wherein the control unit limits the magnitude of said relative drive velocity caused by said steering ratio varying unit to said limiting value when said relative drive velocity is larger than said limiting value in magnitude but does not limit said relative drive velocity in magnitude when said relative drive velocity is not larger than said limiting value in magnitude.

5. The vehicle steering control device according to claim 1 or 3, wherein said power steering unit operates utilizing electric energy supplied by a power source, and
wherein said control unit increases a degree of decreasing said relative drive velocity in magnitude when the electric energy which said power source can supply is low as compared to where the electric energy which said power source can supply is high.

6. The vehicle steering control device according to claim 1 or 3, wherein said control unit increases a degree of decreasing said relative drive velocity in magnitude when a steered angle of said steerable wheels is large in magnitude as compared to where the steered angle of said steerable wheels is small in magnitude.

7. The vehicle steering control device according to claim 1 or 3, wherein said control unit acquires information with respect to a friction coefficient of a road surface and decreases a degree of decreasing said relative drive velocity in magnitude when the friction coefficient of the road surface is low as compared to where the friction coefficient of the road surface is high.

8. The vehicle steering control device according to claim 1 or 3, wherein said power steering unit operates utilizing electric energy supplied by a power source, and
wherein said control unit decreases a degree of decreasing said relative drive velocity in magnitude and limits an output of each of other units which operate utilizing the electric energy supplied by said power source when an urgent necessity of altering an advancing direction of the vehicle is high as compared to where the urgent necessity of altering the advancing direction of the vehicle is low.

9. The vehicle steering control device according to claim 1 or 3, wherein said control unit acquires information with respect to a vehicle speed and decreases said relative drive velocity in magnitude when the vehicle speed is low as compared to where the vehicle speed is high.

10. The vehicle steering control device according to claim 2 or 4, wherein said power steering unit operates utilizing electric energy supplied by a power source, and wherein said control unit variably sets said limiting value according to the electric energy which said power source can supply so that said limiting value decreases when the electric energy which said power source can supply is low as compared to where the electric energy which said power source can supply is high.

11. The vehicle steering control device according to claim 2 or 4, wherein said control unit acquires information with respect to a vehicle speed and decreases said limiting value when the vehicle speed is low as compared to where the vehicle speed is high.

12. The vehicle steering control device according to claim 1, wherein said control unit decreases the magnitude of said relative drive velocity when a vehicle speed is not higher than a first vehicle speed reference value and a magnitude of a steering drive velocity is not smaller than a first steering drive velocity reference value as compared to where the vehicle speed is higher than said first vehicle speed reference value and/or the magnitude of the steering drive velocity is smaller than said first steering drive velocity reference value.

13. The vehicle steering control device according to claim 12, wherein said control unit sets a limiting value for the relative drive velocity of said output member so that said limiting value decreases when the vehicle speed is not higher than the first vehicle speed reference value and the magnitude of the steering drive velocity is not smaller than the first steering drive velocity reference value as compared to where the vehicle speed is higher than said first vehicle speed reference value and/or the magnitude of the steering drive velocity is smaller than said first steering drive velocity reference value, and wherein said control unit limits the magnitude of said relative drive velocity caused by said steering ratio varying unit to said limiting value when said relative drive velocity is larger than said limiting value in magnitude but does not limit said relative drive velocity in magnitude when said relative drive velocity is not larger than said limiting value in magnitude.

14. The vehicle steering control device according to claim 1, wherein said control unit decreases the magnitude of said relative drive velocity when a vehicle speed is not smaller than a second vehicle speed reference value which is larger than a first vehicle speed reference value and the magnitude of a steering drive velocity is not smaller than a second steering drive velocity reference value which is larger than a first steering drive velocity reference value as compared to where the vehicle speed is lower than said second vehicle speed reference value and/or the magnitude of the steering drive velocity is smaller than said second steering drive velocity reference value.

15. The vehicle steering control device according to claim 14, wherein said control unit sets a limiting value for said relative drive velocity so that said limiting value decreases when the vehicle speed is not smaller than the second vehicle speed reference value which is larger than said first vehicle speed reference value and the magnitude of the steering drive velocity is not smaller than the second steering velocity reference value which is larger than said first steering drive velocity reference value as compared to where the vehicle speed is lower than said second vehicle speed reference value and/or the magnitude of the steering drive velocity is smaller than said second steering drive velocity reference value, and wherein said control unit limits the magnitude of said relative drive velocity caused by said steering ratio varying unit to said limiting value when said relative drive velocity is larger than said limiting value in magnitude but does not limit said relative drive velocity in magnitude when said relative drive velocity is not larger than said limiting value in magnitude.

16. A vehicle steering control device, comprising:

an electric power steering unit which generates steering assisting power for driving steerable wheels to steer;

a steering ratio varying unit which drives an output member relative to an input member, which is driven by a steering operation of a driver, to vary a steering ratio that is a ratio of a steering angle variation value of the steerable wheels with respect to a steering operation quantity of the driver; and a control unit which controls said steering ratio varying unit, wherein said control unit sets a first limiting value for said relative drive velocity of said output member so that the first limiting value decreases when a magnitude of a difference between a maximum value of a steering drive velocity range of said steerable wheels which allows said power steering unit to generate a required steering assisting power and an actual steering drive velocity of said steerable wheels is small as compared to where the magnitude of the difference is large, wherein said control unit sets a second limiting value of said relative velocity of said output member so that the second limiting value decreases when a difference between a maximum value of a steering assisting power range which said power steering unit can generate when said steerable wheels are driven to steer at a required steering drive velocity and an actual steering assisting power of said power steering unit is small in magnitude as compared to where said steering assisting power difference is large in magnitude, wherein said control unit sets the smaller value of said first and second limiting values to a final limiting value, and wherein said control unit limits the magnitude of said relative drive velocity caused by said steering ratio varying unit to said final limiting value when said relative drive velocity is larger than said final limiting value in magnitude but does not limit said relative drive velocity in magnitude when said relative drive velocity is not larger than said final limiting value in magnitude.

17. The vehicle steering control device according to claim 16, wherein said power steering unit operates utilizing electric energy supplied by a power source, and wherein said control unit variably sets at least one of said first, second, and final limiting values according to the electric energy which said power source can supply so that at least one of said first, second, and final limiting values decreases when the electric energy which said power source can supply is low as compared to where the electric energy which said power source can supply is high.

18. The vehicle steering control device according to claim 16, wherein said control unit acquires information with respect to a vehicle speed and decreases at least one of said first, second, and final limiting values when the vehicle speed is low as compared to where the vehicle speed is high.

* * * * *